(12) United States Patent
Svantesson et al.

(10) Patent No.: US 11,632,189 B1
(45) Date of Patent: Apr. 18, 2023

(54) SYSTEMS AND METHODS FOR ADAPTIVE SELECTION OF MODULATION AND CODING SCHEMES (MCS) INCLUDING EXAMPLES OF PER-SUB-BAND AND PER-STREAM MCS SELECTION

(71) Applicant: Tarana Wireless, Inc., Milpitas, CA (US)

(72) Inventors: Thomas Svantesson, Santa Clara, CA (US); Kelly Davidson Hawkes, Los Altos, CA (US)

(73) Assignee: Tarana Wireless, Inc., Milpitas, CA (US)

( * ) Notice: Subject to any disclaimer, the term of this patent is extended or adjusted under 35 U.S.C. 154(b) by 0 days.

(21) Appl. No.: 17/067,582

(22) Filed: Oct. 9, 2020

Related U.S. Application Data

(60) Provisional application No. 62/914,337, filed on Oct. 11, 2019.

(51) Int. Cl.
| | |
|---|---|
| *H04W 52/24* | (2009.01) |
| *H04L 1/00* | (2006.01) |
| *H04L 5/00* | (2006.01) |
| *H04W 52/26* | (2009.01) |

(52) U.S. Cl.
CPC .......... *H04L 1/001* (2013.01); *H04L 1/0004* (2013.01); *H04L 1/0016* (2013.01); *H04L 1/0017* (2013.01); *H04L 5/0085* (2013.01); *H04W 52/262* (2013.01)

(58) Field of Classification Search
CPC ... H04L 1/0003; H04L 1/0009; H04L 1/0029; H04L 5/0057; H04L 1/0016; H04L 1/0035; H04L 1/003; H04L 1/0026; H04L 5/0051; H04L 5/0055; H04L 5/0016; H04L 1/1861; H04L 5/0094; H04W 72/042; H04W 88/02; H04W 88/08; H04W 72/044
See application file for complete search history.

(56) References Cited

U.S. PATENT DOCUMENTS

| | | | | |
|---|---|---|---|---|
| 10,938,540 | B2 * | 3/2021 | Seo | H04L 1/0026 |
| 2015/0163773 | A1 * | 6/2015 | Wang | H04L 1/0003 370/329 |
| 2017/0366328 | A1 * | 12/2017 | Seo | H04L 5/0051 |
| 2021/0314877 | A1 * | 10/2021 | Ryu | H04L 5/0048 |
| 2022/0053385 | A1 * | 2/2022 | Li | H04W 36/08 |

OTHER PUBLICATIONS

Dahlman, Erik , et al., "4G: LTE/LTE-Advanced for Mobile Broadband", Orlando, FL, USA: Academic Press, Inc.,, 2011.

* cited by examiner

*Primary Examiner* — Jung Liu

(57) ABSTRACT

The present disclosure describes systems and methods for selecting modulation and coding schemes (MCS) per-sub-band, and in some examples, per-stream. In some examples, channel condition metrics regarding wireless communication conditions from a communication node of a wireless access system may be received. Based at least on the received channel condition metrics, a modulation and coding scheme may be selected. In some examples, the selected modulation and coding scheme may be transmitted to various modulators/demodulators, encoders/decoders, and/or other communication nodes within the wireless access system.

60 Claims, 9 Drawing Sheets

*Diagram (1)*

*Diagram (2)*

*Diagram (3)*

*Diagram (4)*

SYSTEMS AND METHODS FOR ADAPTIVE SELECTION OF MODULATION AND CODING SCHEMES (MCS) INCLUDING EXAMPLES OF PER-SUB-BAND AND PER-STREAM MCS SELECTION

CROSS-REFERENCE TO RELATED APPLICATION

This application claims the benefit under 35 U.S.C. § 119 of the earlier filing date of U.S. Provisional Application Ser. No. 62/914,337 filed Oct. 11, 2019, the entire contents of which is hereby incorporated by reference in its entirety for any purpose.

TECHNICAL FIELD

Examples described herein generally relate to wireless communication technology. Examples of adaptive coding and modulation (ACM) are described for selecting modulation and coding schemes (MCS) per-sub-band, and in some examples, per-stream. Example ACM systems and methods may be used in time-division-duplex (TDD) retro-directive beamforming (RDB) broadband wireless communications (e.g., access) systems, or other wireless communications (e.g., access) systems. Some examples use signal to interference plus noise power ratio (SINR) and transport block error (TBE) metrics to adaptively select MCS.

BACKGROUND

Most broadband wireless communications (e.g., access) systems such as LTE use a broadcast control channel where allocations are signaled with one MCS per allocation. To overcome potentially different channel conditions across the scheduled frequency band, the information bits are coded and interleaved to even out the effects of different channel conditions at different parts of the frequency band. Error rates are further reduced by using hybrid-automatic-repeat-request (HARQ) that sends a Negative Acknowledgement (NACK) if errors in the transmission are detected, and all or portions of the transmission are repeated. If the message is received correctly, an Acknowledgement (ACK) is sent back to the transmit and a new message is sent. For improved performance, the decoder combines information from multiple transmissions and not just the last one. Often a version of HARQ, called incremental redundancy (IR), is used where only a portion of the message is re-transmitted and the receiver combines the log-likelihood-ratios (LLRs) of the original message with the re-transmission. This may allow for fine-tuning over the effective data rate without very precise MCS, which works well with the constraint of a broadcast channel that signals only one MCS per allocation.

BRIEF DESCRIPTION OF THE DRAWINGS

Reference is now made to the following descriptions taken in conjunction with the accompanying drawings, in which.

DETAILED DESCRIPTION

Figure 1A:
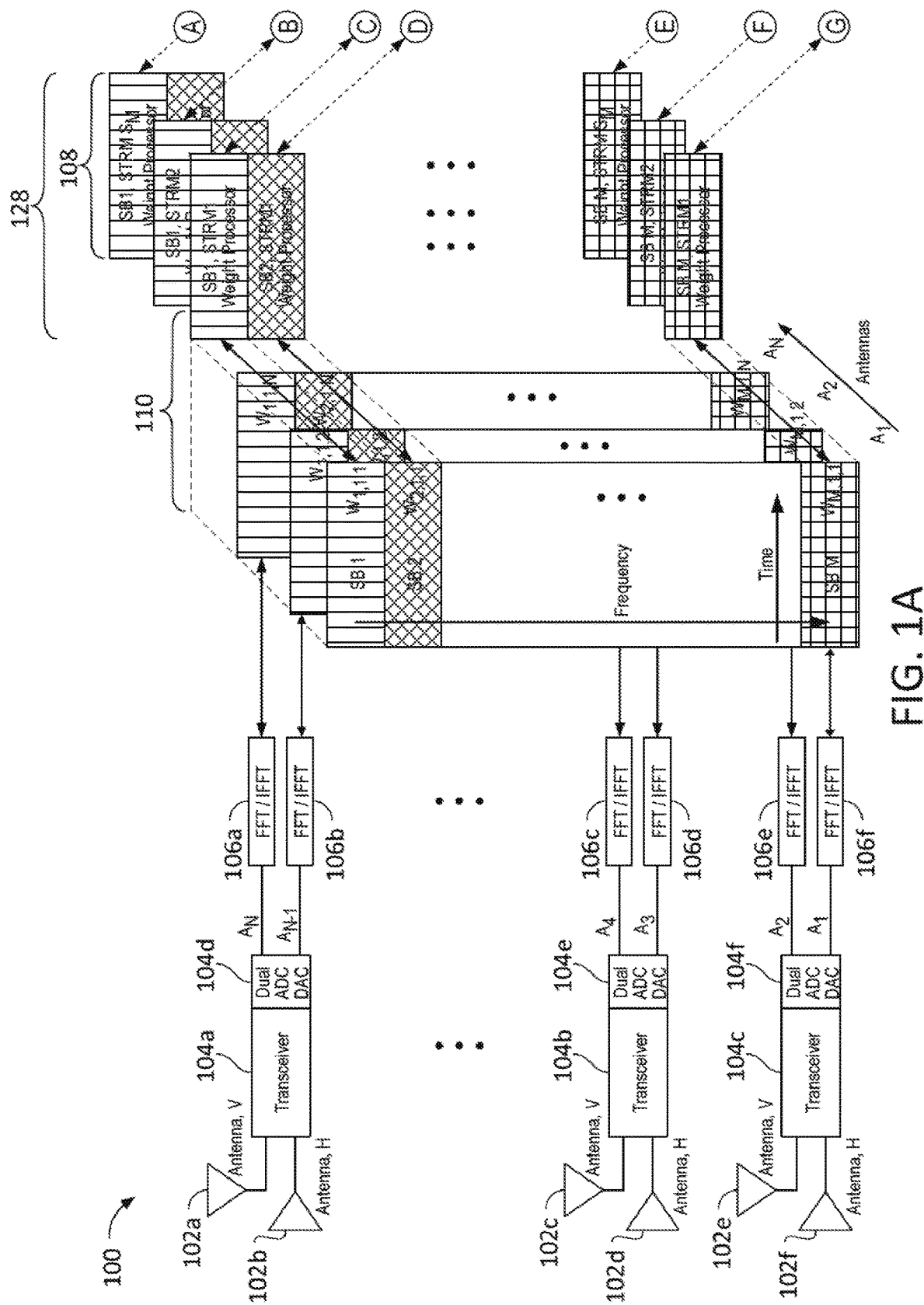
FIGS. 1A and 1B are schematic illustrations of a system for adaptively selecting modulation and coding schemes, arranged in accordance with examples described herein.

Certain details are set forth herein to provide an understanding of described embodiments of technology. However, other examples may be practiced without various ones of these particular details. In some instances, well-known circuits, control signals, timing protocols, and/or software operations have not been shown in detail in order to avoid unnecessarily obscuring the descried embodiments. Other embodiments may be utilized, and other changes may be made, without departing from the spirit or scope of the subject matter presented herein.

Examples described herein include systems and methods for adaptive selection of modulation and coding schemes (MCS). Examples may make MCS selections per-sub-band, and in some examples, per-sub-band and per-stream, which may allow for a finer-grain selection of MCS—for example, an appropriate MCS may be selected for each sub-band per-stream, which may improve performance at each sub-band. In some examples, the adaptive MCS selection techniques described herein may be utilized in broadband wireless access time-division-duplex (TDD) retro-directive beamforming (RDB) systems.

Examples described herein generally pertain to broadband wireless access systems with dynamic user allocations in either time or frequency or spatial dimensions. Examples of broadband wireless access systems include Long-Term-Evolution (LTE) and WiMAX systems. Such systems generally select the modulation and coding scheme (MCS) based on different metrics to achieve a desired throughout and error rate operating point. The techniques (e.g., algorithms) for selecting the MCS may be referred to as adaptive coding and modulation (ACM) techniques (e.g., algorithms), which may distinguish them from systems that use a fixed MCS. Examples described herein include a suite of ACM algorithms for selection of MCS. Examples described herein include examples designed for time-division-duplex (TDD) retro-directive beamforming (RDB) broadband wireless communications (e.g., access) systems with dynamic allocations in time, frequency, or space (e.g., spatial multiplexing of multiple users). Generally, a user herein may refer to a particular communications node (e.g., a residential node) and/or a particular computing system connected to a wireless communications node.

Examples described herein may include one or more base nodes which may be intended to communicate wirelessly to one or more other communications nodes (e.g., residential nodes). A base node may, for example, be positioned on a tower or other centralized location. A residential node may be particular to a building, home, office, or other location. The residential node may in turn be in communication with one or more electronic devices and may facilitate communication between the electronic devices and the base node. Any number or type of electronic device may be serviced using communication techniques described herein including, but not limited to, computing systems, servers, desktops, laptops, tablets, cellular phones, appliances, vehicles, etc.

Recall many existing wireless systems utilize a broadcast control channel where allocations are signaled with one MCS per allocation. Error rates may be reduced in such systems by using hybrid-automatic-repeat-request (HARQ) that sends a Negative Acknowledgement (NACK) if errors in the transmission are detected, and all or portions of the transmission are repeated. A drawback of this scheme is a high implementation complexity of the HARQ including storage on the LLRs. Often many parallel HARQ streams are used which further increases storage requirements. Another drawback of several re-transmissions is an increased latency. Frequency domain duplex (FDD) systems that can quickly send an ACK/NACK on another frequency have a relatively low latency even with multiple re-transmissions. Time-domain-duplex (TDD) systems have to wait for the switch in link-direction plus a transmit time gap due to propagation delays between uplink and downlink, causing an increase in the latency of the system.

Examples described herein include ACM systems and techniques for selection of the MCS which may be used with TDD retro-directive beamforming (RDB) broadband wireless access systems with dynamic allocations in time, frequency, and/or spatial multiplexing of multiple users.

Retro-directive beamforming generally refers to use of the spatial structure of the received signal to decide the spatial structure of a transmitted signal. For example, if a received signal impinging on the receiving antenna array comes primarily from one direction, the transmitter may then transmit back in the same direction. Both analog and digital forms for RDB are possible but the examples herein generally focus on a digital implementation. Since the characteristics of the radio channel typically are frequency dependent, RDB is often implemented for TDD systems where both transmission directions use the same frequency so the receive beamforming weights can be used to derive the transmit beamforming weights.

Beamforming weights generally refer to how to weight the signals received and/or transmitted to and/or from different antennas. This weighting of signals corresponds to forming a spatial signature that may match the channel and may change (e.g., improve and/or optimize) a performance metric. Examples of performance metrics include throughput and signal to noise plus interference ratio (SNIR). For a RDB system with allocations that are dynamic in time, frequency, and or space, a single MCS per allocation may not be optimal.

Consider an orthogonal frequency-division multiple access (OFDMA) RDB system where the allocation unit is a sub-band that is defined as a group of consecutive sub-carriers. The size of a sub-band may be selected such that the channel conditions are similar within a sub-band. However, the conditions between sub-bands can potentially be very different due in part to retro directive beamforming and the spatial compatibility with other users allocated at each sub-band.

Another example that leads to different MCS per-sub-band is that a new spatially multiplexed user can enter the sub-band and change the conditions on that sub-band compared to other sub-bands for a short time. Hence, the signal quality conditions change over both time, sub-band (frequency), and spatial multiplexing conditions (other users). Operating in an un-licensed band (as may occur in examples described herein) may further expose the system to external interference that also can be dynamic in terms of time, frequency, and space. Under these conditions, a single MCS for an allocation spanning multiple (or many) sub-bands may not be optimal.

In some systems, such as RDB systems with dynamic scheduling in time, frequency, space, and possibly exposed to external interference, a better solution may be to use a separate MCS across different parts of the allocation, e.g., a fine-grained MCS selection scheme. A scheme that uses a separate MCS per-sub-band and spatial multiplexing dimension may substantially improve performance in some examples as the MCS is selected to match the channel conditions better. Another benefit may be that fewer re-transmissions typically are required since many errors can be reduced and/or avoided by selecting a lower MCS for parts of the band with challenging conditions. This reduces latency, which may be advantageous, for example, in TDD systems. It also may greatly reduce complexity by providing solutions that do not store many LLRs for parallel streams. Of course, example techniques for fine-grained MCS may still be compatible with HARQ which may yield even higher performance but at a higher complexity. It may also be compatible with ARQ which is a simpler version of HARQ where the full message is retransmitted as opposed to HARQ where the re-transmissions typically modify the transmission and the receiver combines information for all transmissions.

Accordingly, examples described herein include ACM systems and techniques (e.g., algorithms) using metrics for selecting the fine-grained MCS under a variety of conditions. To implement fine-grained MCS selection schemes, fine-grained control and feedback channels may be used.

Figure 1B:
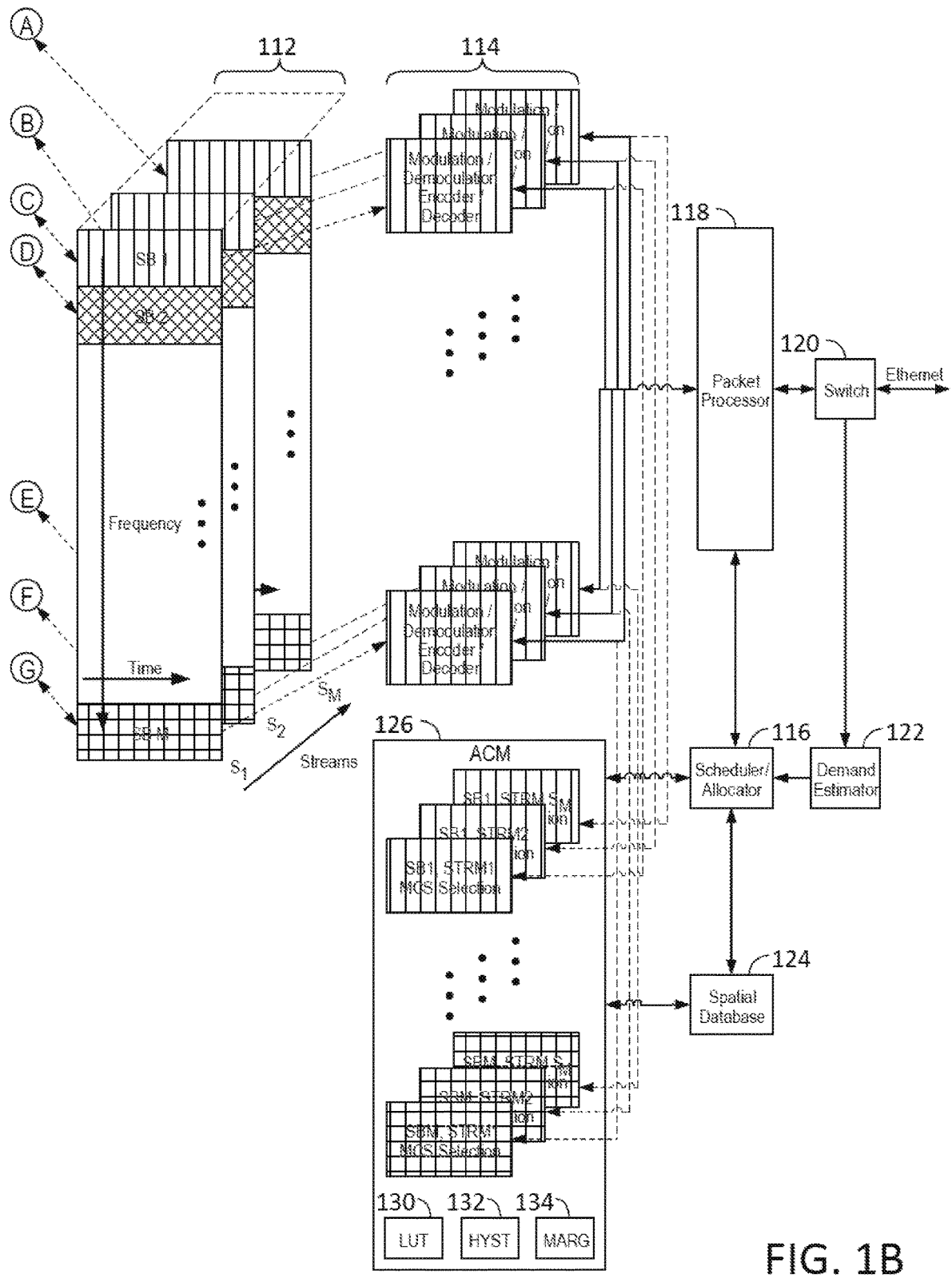

FIGS. 1A and 1B are schematic illustrations of a communication system 100 for adaptively selecting modulation and coding schemes (MCS), arranged in accordance with examples described herein. As described herein, system 100 of FIGS. 1A and 1B includes multiple transceivers, including transceivers 104a, 104b, and 104c. Each transceiver is depicted with two antennas. Transceiver 104a is coupled to antenna 102a and 102b. Transceiver 104b is coupled to antenna 102c and 102d. Transceiver 104c is coupled to antenna 102e and 102f. The transceivers are each coupled to a transform block (e.g., FFT/IFFT 106a-f). The signals at the right-hand side of the transform blocks in FIGS. 1A and 1B are depicted by sets 110. One set (shown as signals arranged in frequency over time) is depicted for each antenna, and within each set are multiple sub-bands of frequencies (e.g., SB1 through SBM). There is one set for each antenna (e.g., antenna $A_1$ through $A_N$). The transform blocks are coupled to weight processors 108. Signals at the right-hand side of the weight processors are depicted as streams 112. Each stream may include a weighted combination of the per-antenna sets of signals. In some examples, each stream in streams 112 may be a communication stream, and in some examples, each communication stream may include a weighted combination of a per-antenna set of signals that, in some examples, an output of a weight processor. In some examples, a system (e.g., system 100) may transmit (or multiplex) multiple information/communication streams on the same time and frequency resource using the spatial dimension (e.g., antennas through the weight processors in system 100) to separate them. This is sometimes called spatial division multiplexing as opposed to time or frequency division multiplexing. In some examples system 100 may use time, frequency, and spatial division multiplexing where the spatial streams (through the antennas and weight processors) provide the spatial division.

The weight processors are coupled to modulation/demodulation encode/decoders 114. In some examples, there may be one or more weight processors per sub-band and per-stream, which each may be coupled to modulation/demodulation encode/decoders 114. The modulation/demodulation encoder/decoders may modulate, demodulate, encode, and/or decode the streams in accordance with modulation coding scheme selections made as described herein. Generally, a modulator/demodulator and/or encoder/decoder may be provided for each sub-band of each stream. ACM circuitry 126 is coupled to the modulator/demodulators and/or encoder/decoders to provide an MCS selection for use by those components as described herein. ACM circuitry 126 may include selection circuitry for each sub-band and/or each stream. The modulator/demodulators and/or encoders/decoders may be coupled to a packet processor 118. The packet processor 118 may be coupled to a switch 120 for receipt of and/or provision of Ethernet or other data. A scheduler/allocator 116 may be coupled to the packet processor 118 and the ACM circuitry 126. A demand estimator 122 may be coupled to the switch 120 and the scheduler/allocator 116. A spatial database 124 may be coupled to the scheduler/allocator 116 and the ACM circuitry 126. ACM circuitry 126 may include and/or be in communication with stored metrics such as look up table (LUT) 130, hysteresis 132, and/or margin 134.

The components shown in FIGS. 1A and 1B are examples. It is to be understood that additional, fewer, and/or different components may be used in other examples. Generally, components shown and described with reference to FIGS. 1A and 1B, which perform processing, calculating, or other data manipulations, may be understood to be implemented in hardware, software, or combinations thereof. For example, the weight processors, modulators/demodulators, encoders/decoders, ACM circuitry, may be implemented using one or more processors and memory encoded with executable instructions for performing their functions (e.g., software). In some examples, one or more application specific integrated circuits (ASICs), field programmable gate arrays (FPGAs), systems on a chip (SOCs), or other logic may be used. Any electronic storage may be used to store metrics or other parameters described herein (e.g., weights, look-up tables, hysteresis, margin), such as any kind of memory.

It is to be understood that the communications node of FIGS. 1A and 1B may be used to both transmit and receive signals. In some instances throughout, particular components may be described with reference to their receive operation or their transmit operation, however it should be understood that the components have dual roles and function in both the receive and the transmit paths.

Examples of systems described herein, such as system 100 of FIGS. 1A and 1B, may be incorporated into and/or otherwise used to implement one or more wireless communication nodes. Examples of wireless communication nodes include base stations, routers, access points, cells, computers (e.g., servers) as well as remote nodes of a wireless network and/or mobile devices such as tablets, handsets (e.g., cellular phones), and laptops. Wireless communication nodes may be used to provide data service (e.g., Ethernet, etc.) to other devices having incorporated communication technology such as televisions, set-top boxes, gaming devices, home automation devices, appliances, and automobiles or other vehicles. Multiple systems described herein, including multiple instances of system 100 of FIGS. 1A and 1B, may be deployed in a communication environment. For example, the system 100 may be used to implement one or more base nodes and/or residential nodes (e.g., routers) which may communicate with one or more electronic devices to provide Ethernet service to the electronic device. Depending on the node type, some of the system blocks in system 100 may be different. For example, the ACM circuitry (e.g., ACM circuitry 126 of FIGS. 1A and 1B) of a base node may select the MCS while the ACM circuitry of a residential node may receive and apply the selected MCS. Although it may be applicable to any node, FIGS. 1A and 1B generally focuses on a base node perspective.

Accordingly, examples of communication nodes described herein may include transceivers, such as the transceivers 104a-c shown in FIGS. 1A and 1B. Each transceiver may include a dual digital converter unit including an analog to digital converter and/or a digital to analog converter. For example, transceiver 104a may include dual digital converter unit 104d. Transceiver 104b may include dual digital converter unit 104e. Transceiver 104c may include dual digital converter unit 104f. Transceivers may generally include both transmitter and receiver components and/or share circuitry used to perform transmitting and receiving. In some examples, a transceiver may include separate transmitter and receiver components. In some examples, transceivers described herein may include and/or be coupled to two digital-to-analog converters in a dual digital converter unit, such as dual digital converter units 104d-104f. In some examples, converter units described herein convert a signal incident on one or more antennas of system 100 from analog to digital. Additionally and/or alternatively, in some examples, converter units described herein may convert a signal to be transmitted by the one or more antennas of system 100 from digital to analog.

Examples of systems described herein include transceivers (e.g., wireless communication transceivers), such as transceiver 104a, transceiver 104b, and transceiver 104c of FIGS. 1A and 1B. While three transceivers are provided with reference numbers in FIGS. 1A and 1B, any number of transceivers may be included in the system (as indicated by the multiple dots in FIGS. 1A and 1B). For example, 1, 2, 3, 4, 5, 6, 7, 8, 9, 10, 16, 32, 64, 128, and/or other numbers of transceivers may be used in other examples. The transceivers, at their right-hand side in FIGS. 1A and 1B may each provide and/or receive a data stream corresponding to RF signals incident on and/or transmitted by the antenna(s) to which they are connected. The data stream may be, for example, a discretized version of the RF signals incident on one or more antenna(s). One or more data streams may include data, such as training data, which may be used (e.g., by a weight processor) to generate weights.

Examples of transceivers described herein may be coupled to antennas. For example, transceiver 104a is depicted coupled to antenna 102a and antenna 102b. Transceiver 104b of FIGS. 1A and 1B is depicted coupled to antenna 102c and antenna 102d. Transceiver 104c of FIGS.

1A and 1B is depicted coupled to antenna 102e and antenna 102f. Generally, multiple antennas coupled to a single transceiver may each be used to (e.g., tuned to) receive a particular polarization (e.g., indicated by 'Antenna V' and 'Antenna H' in FIGS. 1A and 1B. In some examples, one or more transceivers may be coupled to only a single antenna. Radio frequency (RF) signals may be incident on and/or transmitted by antennas as described herein. Generally, the RF signals may be received in a frequency band (e.g., a sub-band) that may include multiple subcarrier frequencies.

System 100 may include one antenna and/or may include multiple antennas—e.g., system 100 may be a multiple antenna system, otherwise referred to as a multiple-input multiple output (MIMO) system. In this manner, any number of antennas may be provided in systems described herein, such as 1, 2, 3, 4, 5, 6, 7, 8, 9, 10, 16, 32, 64, 128, 256, or other number of antennas. Multiple antennas provided in a system (e.g., in a mobile communication device) may be referred to as an antenna array. The antenna array may be local to one device (e.g., the antennas may be provided in a same device), or the antenna array may be distributed in some examples. For example, the antennas shown in FIGS. 1A and 1B may be included in separate devices distributed about an environment in some examples. Transceivers in communication with the distributed antennas may be in communication with one another and/or with a beamforming network to facilitate techniques described herein (e.g., TDD RDB). In some examples, the signals incident on the one or more antennas may be time varying signals received by the one or more antennas in the time domain. In some examples, the signals to be transmitted by the one or more antennas need to be transformed from a frequency domain to the time domain.

Examples of system described herein may include transforms, such as Fast Fourier Transform (FFT) and/or Inverse Fast Fourier Transform (IFFT) blocks 106a-f. FFT and/or IFFT blocks 106a-f may be implemented in hardware, software, or combinations thereof. Circuitry may be used to implement FFTs and/or IFFTs. Transforms may be coupled (communicatively or otherwise) to one or more transceivers. For example, FFTs and IFFTs 106a and 106b are depicted coupled to transceiver 104a. FFTs and IFFTs 106c and 106d are depicted coupled to transceiver 104b. FFTs and IFFTs 106e and 106f are depicted coupled to transceiver 104c.

In some examples, the transforms may convert (or transform) an output of the connected transceiver, e.g., a signal incident on one or more antennas of a wireless access system, such as antennas 102a-102f of FIGS. 1A and 1B, from the time domain to the frequency domain. In some examples, the transforms, may convert (or transform) the signal incident on the one or more antennas using a Fast Fourier Transformation (FFT). Additionally and/or alternatively, in some examples, the transforms may be configured to convert (or transform) a signal to be transmitted by one or more antennas, such as antennas 102a-102f of FIGS. 1A and 1B, from the frequency domain to the time domain. In some examples, an Inverse Fourier transform may convert (or transform) the signal to be transmitted by one or more antennas using an Inverse Fourier Transformation (IFFT). A size of the transform may correspond to a number of subcarriers used in the communications sent to and from the communications node of FIGS. 1A and 1B. Any number of subcarriers may be used, 4096 subcarriers over a 40 MHz carrier, in one example, although any number may be used.

During operation, signals at the right-hand side of the transform blocks 106a-f in FIGS. 1A and 1B are depicted as sets 110. Each set corresponds to signals provided to and/or from a particular antenna (e.g., a particular transceiver). The sets 110 include signals arranged in frequency and time—with the frequencies spanning multiple sub-bands. Each sub-band may include a number of sub-carriers, 52 sub-carriers in one example, although any number may be used. Generally, a sub-band spans a portion of the frequency (e.g., portion of sub-carriers) over which channel characteristics may be approximated as flat (e.g., equal). The sub-bands are labeled SB-1 through SB-M in FIGS. 1A and 1B.

Examples of systems described herein may include a beamforming network (e.g., one or more beamformers), such as beamforming network 128 of FIGS. 1A and 1B. Beamforming network 128, in some examples, may include one or more weight processors, such as weight processor 108. The beamforming network may provide the signal to be transmitted by each of the multiple transceivers and/or antennas of the system (e.g., system 100 of FIGS. 1A and 1B). The beamforming network may be used to additionally and/or alternatively combine signals received at multiple antennas to form a received signal (e.g., a stream, a data stream, etc.). The beamforming network 128 may include a weight processor 108, which may be used to calculate weights for each of the transceivers and/or antennas in the system. Generally, beamforming networks may be implemented using one or more processors (e.g., central processing unit(s) (CPUs), microprocessors etc.), which may execute instructions stored in one or more computer readable media, and/or circuitry for performing computations (e.g., field programmable gate array (FPGA) circuitry, and/or software on chip (SOC), and/or advanced reduced instruction set machine (ARM) computing architectures, and/or application specific integrated circuits (ASICs)). In some examples, beamforming network 128 may be a bi-directional beamforming network. In some examples, beamforming network 128 may be a time-division-duplex (TDD) retro-directive beamforming (RDB) network.

Beamforming networks described herein and utilized in devices and/or systems herein may include one or more weight processors, such as weight processor 108 of FIGS. 1A and 1B Weight processor 108 may be used to calculate and/or apply weights to be used by beamforming network 128 to generate signals for transmission by multiple (or one or more) antennas in system 100 and/or to combine signals received by multiple antennas in system 100. Accordingly, such beamforming network 128, may receive data streams from one or more transceivers and may calculate and/or use, for each subcarrier of a frequency band, a respective plurality of weights used to generate signals for transmission by or combine the signals received at respective ones of the plurality of antennas. In the example of FIGS. 1A and 1B, the weights are depicted as W having three indices—where the indices correspond to sub-band, stream, and antenna. For example $W_{1,2,4}$ would refer to the weight used for sub-band 1 (SB-1), stream 2, and antenna 4. In this manner, the weight processors may utilize the weights to combine certain sub-bands from certain antennas into streams. A particular weight processor, may for example, be particular to a sub-band and a stream—for example the "SB1, STRM 1 weight processor" of FIGS. 1A and 1B may create one sub-band of signals for one stream. The weight processor may create the sub-band of signals for the stream by combining signals from the multiple antennas in that sub-band in accordance with the weights. In this manner, different weightings of antennas may be used to for different sub-bands and different streams.

Accordingly, the signals at the right-hand side of weight processors in FIGS. 1A and 1B are depicted as streams $S_1$-$S_M$, with data in each stream arranged in multiple sub-bands, each having frequency and time dimensions.

Examples of systems described herein may include one or more encoders, decoders, modulators, and/or demodulators, depicted herein as modulation/demodulation encode/decoders 114 of FIGS. 1A and 1B. In some examples, modulation/demodulation encode/decoders 114 may be configured to modulate and encode data intended for transmission by the system and/or de-modulate and decode data intended for reception by the system. While a select number of encoders, decoders, modulators, and demodulators are depicted as modulation/demodulation encode/decoders 114 in system 100 of FIGS. 1A and 1B, it should be appreciated, any number of encoders, decoders, modulators, and demodulators may be used in system 100, including additional, fewer, and/or different encoders, decoders, modulators, and demodulators. As shown in FIGS. 1A and 1B, there may generally be one modulator/demodulator and/or encoder/decoder for each sub-band of each stream. The encoders, decoders, modulator, and demodulators of FIGS. 1A and 1B may operate in accordance with an MCS selection received from ACM circuitry 126. The MCS selection may be particular to a certain sub-band and/or certain stream. Accordingly, the MCS selection used to modulate/demodulate and/or encode/decode a particular sub-band of a particular stream (e.g., SB-M of $S_1$) may be different than the MCS selection used to modulate/demodulate and/or encode/decode a different sub-band of that stream or a different stream (e.g., SB-2 of S2). In some examples, the MCS for the same sub-band may be different per-stream. For example, the MCS of SB-M of $S_1$ may be different from SB-M of $S_2$. In this manner, an MCS selection may be made with regard to metrics appropriate for a particular sub-band and/or stream.

In some examples, modulation/demodulation encode/decoders 114 may be configured to modulate a data stream intended for transmission by the one or more antennas of system 100 to, for example, other communications nodes (e.g., remote notes, residential notes, etc.) within a wireless communications system. In some examples, modulation/demodulation encode/decoders 114 may modulate the data stream in accordance with a modulation and coding scheme selected by modulation and coding scheme circuitry, such as ACM circuitry 126 of FIGS. 1A and 1B, as described herein. In some examples, modulation/demodulation encode/decoders 114 may demodulate a data stream derived from a signal incident on the one more antennas of system 100 and received by, for example, other communications nodes (e.g., remote notes, residential notes, etc.) within a wireless communications system. In some examples, modulation/demodulation encode/decoders 114 may demodulate the data stream in accordance with a modulation and coding scheme selected by modulation and coding scheme circuitry, such as ACM circuitry 126 of FIGS. 1A and 1B, as described herein.

In some examples, modulation/demodulation encode/decoders 114 may configured to encode a data stream intended for transmission by the one or more antennas of system 100 to, for example, other communications nodes (e.g., remote notes, residential notes, etc.) within a wireless communications system. In some examples, modulation/demodulation encode/decoders 114 may encode the data stream in accordance with a modulation and coding scheme selected by modulation and coding scheme circuitry, such as ACM circuitry 126 of FIGS. 1A and 1B, as described herein. In some examples, modulation/demodulation encode/decoders 114 may configured to decode a data stream derived from a signal incident on the one more antennas of system 100 and received by, for example, other communications nodes (e.g., remote notes, residential notes, etc.) within a wireless communications system. In some examples, modulation/demodulation encode/decoders 114 may decode the data stream in accordance with a modulation and coding scheme selected by modulation and coding scheme circuitry, such as ACM circuitry 126 of FIGS. 1A and 1B, as described herein.

In some examples, beamforming network 128 may operate between the transceivers of system 100 and other components of system 100, such as, for example, modulation/demodulation encode/decoders 114, scheduler 116, packet processor 118, demand estimator 122, spatial database 124, ACM circuitry 126, and switch 120 (or hub) which may be used to route data traffic. In some examples, beamforming network 128 may be bi-directional, meaning that it may function as an adaptive (receive) beamformer during the receive cycle, and as a transmit beamformer during the transmit cycle.

Examples of systems described herein may include a hub or switch, such as switch 120 of FIGS. 1A and 1B that may provide demodulated data to and/or from the encoders. In this manner RF signals incident on the antennas may generally be converted into received data and/or data provided to the system 100 may be converted into RF signals transmitted by the antennas.

Examples of systems described herein may include one or more schedulers, such as scheduler 116 of FIGS. 1A and 1B. In some examples, scheduler 116 may provide scheduling information to a packet processor, such as packet processor 118 of FIGS. 1A and 1B. In some examples, the scheduling information provided to packet processor 118 may include information regarding sub-band and/or stream allocations for particular users. In some examples, the scheduling information may include spatial information, compatibility information, or combinations thereof. In some examples, scheduler 116 may additionally and/or alternatively provide scheduling information to other components of system 100 described herein.

As described herein, a wireless communications system may include various communications nodes, including base nodes, remote nodes, residential nodes, and the like. In some examples, the distance information transmitted by scheduler 116 to packet processor 118 may include the distance between a particular remote (e.g., residential) node of the wireless communications system and the base node. In some examples, the spatial information transmitted by scheduler 116 to packet processor 118 may include the location information between various remote (e.g., residential) nodes of the wireless communications system. In some examples, the compatibility information transmitted by scheduler 116 to packet processor 118 may include information regarding the compatibility between the base node and a remote (e.g., residential node). In some examples, scheduler 116 may provide information to packet processor 118 regarding which sub-band(s) and/or which stream(s) a user (e.g., a remote node) has allocated. In some examples, that formation may be based at least in part on spatial information (between remote nodes of the wireless communications system), compatibility information (between remote nodes of the wireless communications system), distance information, location information, and the like.

In some examples, scheduler 116 may provide allocation information to adaptive modulation and coding scheme circuitry, such as ACM circuitry 126 of FIGS. 1A and 1B. In some examples, the allocation information provided to ACM circuitry 126 may include current allocation information, upcoming allocation information, spatial information, or combinations thereof. In some examples, ACM circuitry 126 may base an initial MCS selection at least in part on the allocation information provided by scheduler 116. In some examples, ACM circuitry 126 of FIGS. 1A and 1B may base an initial MCS selection based exclusively on the allocation information provided by scheduler 116. In some examples, ACM circuitry 126 of FIGS. 1A and 1B may base an initial MCS selection based in part on the allocation information provided by scheduler 116 in addition of other information described herein. In some examples, the allocation information may be dynamic in time, frequency, space, or combinations thereof. In some examples, ACM circuitry 126 may share information with scheduler 116, such as, for example, margin 134, hysteresis 132, and LUT 130. In some examples, based at least on this information, scheduler 116 may determine (e.g., decide) an initial MCS selection.

Examples of systems described herein may include one or more packet processors, such as packet processor 118 of FIGS. 1A and 1B. In some examples, packet processor 118 may receive various information packets and allocate them (e.g., break them up, fragment) into particular sub-bands and streams for a particular user (or remote node) of the wireless communications system described herein. In some examples, if system 100 is using ARQ and/or HARQ, such operations and/or functionality may be handled by packet processor 118.

In some examples, Packet processor 118 may receive other packets additionally and/or alternatively to the Ethernet packets, where the other packets are intended for transmission. Examples of other packets described herein may include information packets, input packets, output packets, modem packets, and the like. Packet processor 118 may, in some examples, break the other packets up (e.g., allocate them, fragment them) into particular sub-bands and streams for a particular user (or remote node) of the wireless communications system described herein. In some examples, packet processor 118 may break up the received Ethernet and/or other packets based on scheduling information (e.g., least distance information to a particular communication node of a wireless communications system, spatial information, compatibility information, or combinations thereof) received from scheduler 116. In some examples, packet processor 118 may break up (e.g., allocate, fragment) input packets into modem packets. In some examples, packet processor 118 may break up input packets statically, dynamically, or combinations thereof.

As one example, a particular Ethernet packet may need transmitting for to a particular user of the wireless communications system described herein. Scheduler 116 may determine, receive, etc. scheduling information for that particular user. For example, Scheduler 116 may determine the particular user may receive transmissions using a particular sub-band(s) on a particular stream(s), such as sub-band M on Stream 1, as well as sub-band 4 on Stream 2. Scheduler 116 may provide this (and/or other scheduling information) to packet processor 118. Based at least on the received scheduling information from scheduler 116, packet processor 118 may break up (e.g., allocate) the Ethernet packet for the particular user to sub-band M on Stream 1, and sub-band 4 on Stream 2.

Examples of systems described herein may include one or more spatial database, such as spatial database 124 of FIGS. 1A and 1B. Recall that the wireless communications system described herein may include various communications nodes, such as base nodes, residential nodes, remote nodes, and the like. In some examples, spatial database 124 may include spatial information regarding various communications nodes within the wireless communications system, to which the communication node of FIGS. 1A and 1B may be in communication. In some examples, the spatial information included in spatial database 124 may be used to determine allocations (e.g., sub-band allocations, stream allocations, combinations thereof, and the like) by scheduler 116 of FIGS. 1A and 1B. For example, users (e.g., remote nodes, residential nodes, etc.) within a threshold distance of one another within the wireless communications system (or based on various spatial channel characteristics or geographical location(s)) may not, in some examples, be allocated a same sub-band, as it may cause interference (e.g., transmission interference, receive interference, etc.).

In some examples, spatial database 124 of FIGS. 1A and 1B may provide spatial information to adaptive modulation and coding scheme circuitry, such as ACM circuitry 126 of FIGS. 1A and 1B. In some examples, ACM circuitry 126 may base an initial MCS selection at least in part on the spatial information provided by spatial database 124. In some examples, ACM circuitry 126 of FIGS. 1A and 1B may base an initial MCS selection based exclusively on the spatial information provided by spatial database 124. In some examples, ACM circuitry 126 of FIGS. 1A and 1B may base an initial MCS selection based in part on the spatial information provided by spatial database 124 in addition of other information described herein.

Examples of systems described herein may include one or more demand estimators, such as demand estimator 122 of FIGS. 1A and 1B. In some examples, demand estimator 122 may review (e.g., analyze) and/or monitor various information packets (e.g., packets, other packets, output packets, input packets, modem packets, etc.) queued by a switch, such as switch 120 of FIGS. 1A and 1B, for various users (e.g., remote nodes, residential nodes, etc.) and/or a packet processor, such as packet processor 118 (which in some examples may also maintain a queue) of the wireless communications system described herein. In some examples, if a user has a higher number of queued packets, demand estimator 122 may cause a scheduler, such as scheduler 116 of FIGS. 1A and 1B to allocate more sub-bands and/or streams to that user to flush out the queue.

Examples of systems described herein may include one or more adaptive modulation and coding circuitry, such as ACM circuitry 126 of FIGS. 1A and 1B. ACM circuitry 126 may select a modulation and coding scheme (MCS) for encoding/decoding and/or modulating/demodulating each stream of the plurality of streams incident on antennas of system 100, and/or signals for transmission by antennas of system 100. In some examples, ACM circuitry 126 selects the MCS based on channel condition metrics (e.g., fine-grained metrics) regarding wireless communication conditions. In some examples, channel condition metrics may include a signal-to-interference-and-noise-ratio (SINR), codec conditions, or combinations thereof. In some examples, codec conditions may include error counts, transport block error rates, decoder iterations, or combinations thereof. The channel condition metrics may be particular to individual sub-bands or streams, or groups of sub-bands and streams. In this manner, ACM circuitry 126 may utilize sub-band and/or stream-specific channel condition metrics to select an MCS for individual sub-bands and/or streams which may be different than selections made for other sub-bands and/or streams.

Generally, and as described herein, components shown and described with reference to FIGS. 1A and 1B, which perform processing, calculating, or other data manipulations, may be understood to be implemented in hardware, software, or combinations thereof. For example, ACM circuitry, may be implemented using one or more processors and memory encoded with executable instructions for performing their functions (e.g., software). In some examples, one or more application specific integrated circuits (ASICs), field programmable gate arrays (FPGAs), systems on a chip (SOCs), or other logic may be used.

In some examples ACM circuitry 126 may receive channel condition metrics from one or more remote (e.g., residential) nodes of a wireless communications system. In some examples ACM circuitry 126 may receive channel condition metrics from one or more base nodes of the wireless communications system. In some examples ACM circuitry 126 may receive channel condition metrics from an administrator or owner or the wireless communications system. In some examples, ACM circuitry 126 may receive channel condition metrics from the modulators, demodulators, encoders, and/or decoders, such as modulation/demodulation encode/decoders 114, as described herein. For example, error rates may be provided by encoders and/or decoders. As should be appreciated, while other remote (e.g., residential) nodes, base nodes, and administrators are discussed from where to receive channel condition metrics, ACM circuitry 126 may receive channel condition metrics from various other components shown and not shown within system 100 and/or within a wireless communications system, which are each within the scope of the present disclosure.

In some examples, during operation, ACM circuitry 126 may not have access to or may not have yet received channel condition metrics. In such examples (and/or other examples), ACM circuitry 126 may make an initial MCS selection based at least in part on allocation information, such as current allocation information, upcoming allocation information, spatial information, or combinations thereof, provided to it by scheduler 116 as described herein. Similarly, in such examples (and/or other examples), ACM circuitry 126 may make an initial MCS selection at least on spatial information regarding various communications nodes within the wireless communications system to which the communication node of FIGS. 1A and 1B may be in communication, provided to it by spatial database 124 as described herein.

In some examples, ACM circuitry 126, may have access to channel condition metrics. In such examples (and/or other examples), ACM circuitry 126 may select an MCS using channel condition metrics. In such examples (and/or other examples), ACM circuitry 126 may select an MCS using channel condition metrics, and the allocation information. In such examples (and/or other examples), ACM circuitry 126 may select an MCS using channel condition metrics, and the spatial information. In such examples (and/or other examples), ACM circuitry 126 may select an MCS using channel condition metrics, the allocation information, and the spatial information.

In some examples, ACM circuitry 126 may additionally and/or alternatively select an MCS based at least on a capacity utilization of the wireless communications system. In some examples, ACM circuitry 126 may additionally and/or alternatively select an MCS based at least on a look up table (LUT). The LUT may store an association between MCS selection and channel condition metrics, for example. In some examples, ACM circuitry 126 may additionally and/or alternatively select an MCS based at least on various selection parameters. In some examples, selection parameters may include a margin, a hysteresis, or combinations thereof. In some examples, the margin value may adapt during operation, which may be designed to achieve a performance criterion. In some examples, the performance criterion may be predetermined. In some examples, the performance criterion may be determined by an administrator of the wireless communications system. In some examples, the performance criterion may be determined by other components of the wireless communications system. In some examples, the performance criterion may include at least one of a specific error rate, a re-transmission rate, a decoder quality performance metric, or combinations thereof. In some examples, the margin may be configured to adapt based at least on a granularity of a sub-banned spanned by the selected MCS.

In some examples, ACM circuitry 126 may additionally and/or alternatively select an MCS based at least on a preferred MCS switching rate. In some examples, ACM circuitry 126 may additionally and/or alternatively select an MCS based at least on scheduling information. In some examples, ACM circuitry 126 may additionally and/or alternatively select an MCS based at least on adaptive modulation and coding scheme algorithms as described herein. In some examples, ACM circuitry 126 may additionally and/or alternatively select an MCS based at least on a padding used to encode blocks to lower error rates, where in some examples, the padding comprises the difference between a capacity and a demand. As should be appreciated, ACM circuitry 126 may additionally and/or alternatively select an MCS based at least on any combinations of the above-recited metrics, parameters, look up tables, and/or information.

As described herein, ACM circuitry 126 may select an MCS per-sub-band and/or per-stream. In some examples, an MCS selected for a particular sub-band and or stream by ACM circuitry 126, may be different than an MCS selected for a different sub-band and/or stream by ACM circuitry 126. For example, ACM circuitry 126 may select different MCS for different sub-bands and/or different streams. In some examples, ACM circuitry 126 may select similar and/or the same MCS for different sub-bands and/or streams.

In some examples, ACM circuitry 126 may transmit a selected MCS (e.g., per-sub-band, per-stream) to a modulator/demodulator and/or an encoder/decoder, such as modulation/demodulation encode/decoders 114 of FIGS. 1A and 1B. As described herein, modulation/demodulation encode/decoders 114 modulate and/or encode a data stream intended for transmission by the one or more antennas of system 100 to, for example, other communications nodes (e.g., remote notes, residential notes, etc.) within a wireless communications system in accordance with an MCS selected by and transmitted from modulation and coding scheme circuitry, such as ACM circuitry 126 of FIGS. 1A and 1B. Additionally, and as described herein, modulation/demodulation encode/decoders 114 may demodulate and/or decode a data stream derived from a signal incident on the one more antennas of system 100 and received by, for example, other communications nodes (e.g., remote notes, residential notes, etc.) within a wireless communications system in accordance with an MCS selected by and transmitted from modulation and coding scheme circuitry, such as ACM circuitry 126 of FIGS. 1A and 1B.

As should be appreciated, ACM circuitry 126 may be implemented in hardware, software, firmware, or combinations thereof. ACM circuitry 126 may, for example, including one or more processors, controllers, and/or circuitry. ACM circuitry 126 may include one or more computer readable media encoded with instructions (e.g., code) which, when executed, cause ACM circuitry 126 to perform operations described herein.

Figure 3:
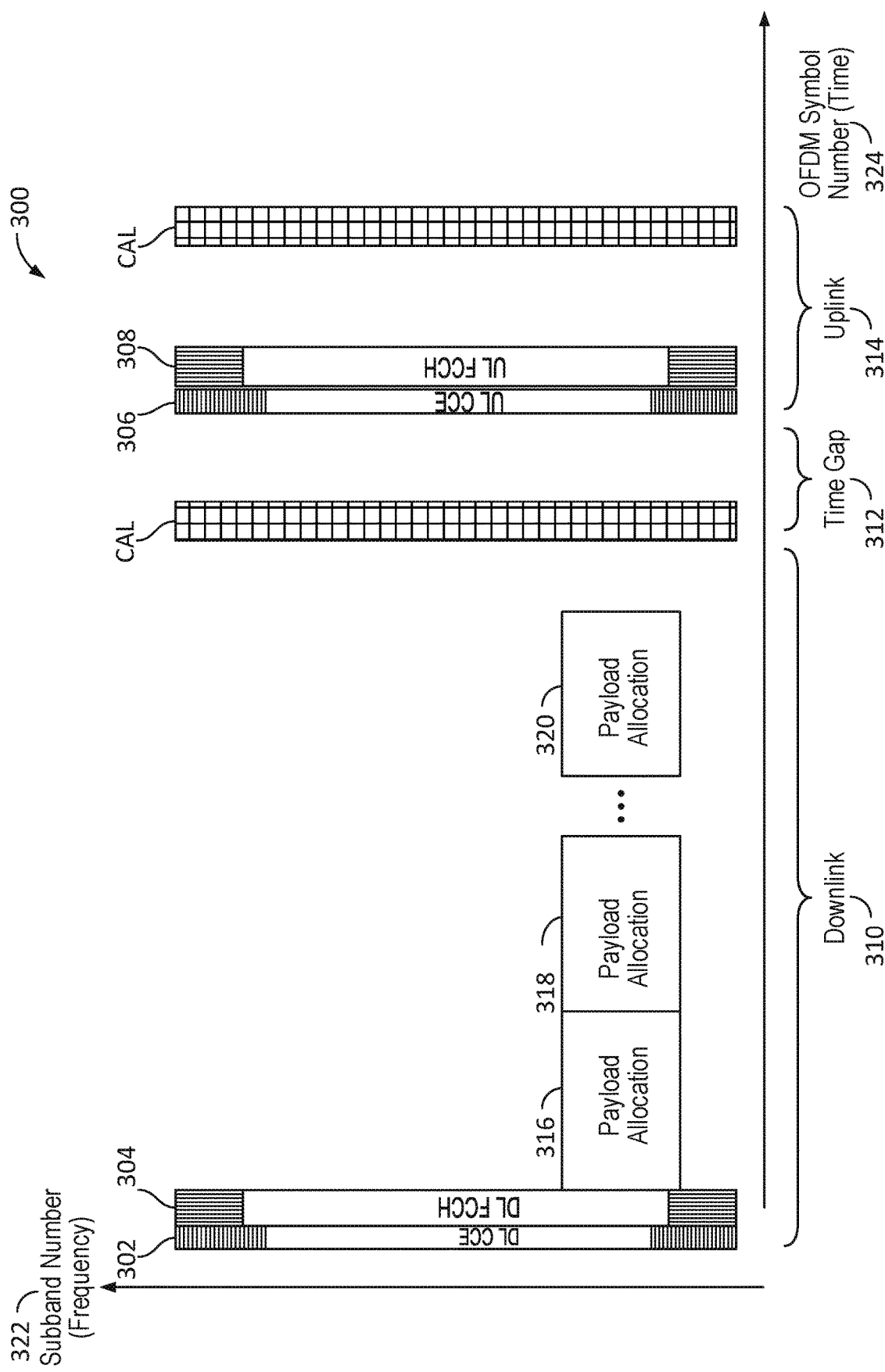
FIG. 3 is a schematic illustration of a radio frame structure, in accordance with examples described herein.

Now turning to FIG. 3, FIG. 3 is a schematic illustration of a radio frame structure 300 (e.g., frame 300), in accordance with examples described herein. Many modern wireless communications systems (e.g., LTE, WiMax, etc.) have adopted OFDM and/or OFDM multiple-access (OFDMA) as a communication standard, as described herein. Under OFDM the frequency domain is divided into a set of equally spaced subcarriers, and the time domain is divided into equally spaced symbols as shown in FIG. 3. In some examples, other transforms that create frequency bands are compatible with the ACM algorithms described herein.

Systems and methods described herein may transmit allocation information over a first channel type and the identification of selected modulation and coding scheme(s) over a second channel type. In this manner, the allocation information may be transmitted separately from the MCS selection information. The MCS selection information, recall, may be transmitted on a per-sub-band and/or per-stream basis.

FIG. 3 illustrates subcarriers and symbols in accordance with examples described herein. The vertical-axis 322 represents frequency, while the vertical-axis 324 represents time. The frequency domain (e.g., vertical-axis) is divided into sub-bands, with an undisclosed number of sub-bands being shown in FIG. 3, although any number may be used. Each sub-band contains a specified number of subcarriers, not shown, corresponding to the bins of an OFDM Fast Fourier Transform (FFT) residing within that sub-band. The time domain (e.g., horizontal-axis) is divided into FFT blocks, referred to herein as OFDM symbols. An undisclosed number of OFDM symbols are shown in FIG. 3, although any number may be used within the same or a different amount of time by resizing the FFT as needed. The frame structure shown in FIG. 3 may be used to transmit data to and/or from the system shown in FIGS. 1A and 1B.

Under OFDM, payload data may be transmitted on each subcarrier in each symbol, in some examples as quadrature amplitude modulated (QAM) constellation samples (e.g., payload blocks 316, 318, and 320). In addition, a subset of subcarriers may be designated as non-payload pilot symbols, which may be used to provide amplitude and/or phase reference.

In some examples, a base station (BS) or base node (BN) is transmitting to a user equipment (UE) or residential node (RN) of a wireless communications system, during the first part of the frame 300. This part is often called the down-link (DL) part of the frame, e.g., downlink 310. After a time gap, e.g., time gap 312, the RN is transmitting to the BS or BN for the remainder of the frame. That part is often called the up-link (UL) portion of the frame, e.g., uplink 314. In some examples, user allocations are scheduled in units of a sub-band that spans a number of OFDM subcarriers, e.g. downlink allocation information 302. This may be a first channel type—one that sends allocation information (and/or timing information, power control information, system information, and the like). The channel type containing allocation information may also be referred to as a control channel element (CCE) herein. The CCE refers to a portion of symbols and/or time in a frame used to transmit allocation information (e.g., which users are associated with which sub-bands and/or streams or other transmission segments). In some examples, a user (e.g., remote node) may in some cases have a CCE which spans two sub-bands and one OFDM symbol. As should be appreciated, while the size may be different, in some examples, the CCE may always be present. In some examples, the FCCH may be present for allocated sub-bands and streams.

In some examples, for TDD RDB systems, UL and DL allocations may span the same sub-bands to exploit channel reciprocity. In some examples, selected MCSs are scheduled in units of a sub-band that spans a number of OFDM subcarriers, e.g., downlink per-sub-band MCS information 304. This may be a second channel type—one that sends MCS information. The channel type containing MCS information may also be referred to as a fast control channel (FCCH). The FCCH refers to a portion of symbols and/or time in a frame used to transmit MCS information (e.g., which MCS is associated with a particular sub-band and/or stream). In some examples, the remaining symbols may be used for control channels, beamformer training, and channel sounding.

In some examples, an MCS selection and the feedback channels (CCE/FCCH) may be different in UL and DL. In some example systems, the BN may select both the UL and DL MCS, but in some examples, the selected MCS for the UL may be different than the MCS selected for the DL.

In some examples, and as described herein, various packets, such as input packets, may be converted into modem packets (e.g., by packet processor 118 of FIGS. 1A AND 1B) that in turn are sent over the link in one or many transport blocks (TB) (e.g., payload 316, 318, and 320) depending, in some examples, on packet size and TB MCS across the allocated sub-bands and symbols. The mapping of modem packets into transport blocks can be done in many ways. A simple mapping is the natural order while more complicated mappings such as various forms of pseudo-random mappings that spreads a modem packet across the transport blocks are possible. Furthermore, the transport blocks can be mapped or striped into sub-bands in many different ways as well. In some examples, a transport block may be encoded and transmitted in a one or more frames (e.g., radio frames) in accordance with an MCS selection. In some examples, a transport block as described herein may be derived from a packet, such as an Ethernet packet, an input packet, and/or a modem packet. In some examples, a modem packet may be derived from an input packet or Ethernet packet. For example, an Ethernet and/or an input packet may be broken down into modem packets that in some examples may be broken into transport blocks which in some examples are what the MCS is selected for (e.g., what the MCS is applied to). As should be appreciated, there are various packet to transport block schemes which are contemplated to be within the scope of this disclosure. As should be further appreciated, the ACM applies to the various packet to transport block schemes, and the discussion of Ethernet and/or input packets to modem packs, and modem packets to transport blocks is in no way limiting. In some examples, the MCS is selected to be applied to transport blocks prior to transmission from, for example, a base node, and/or after being received, for example, at a base node.

In some examples, uplink allocation information 306 and per-sub-band MCS information 304 may be sent back to the BS or the BN, by the RN. In some examples, uplink allocation information 306 and per-sub-band MCS information 304 sent back by the RN may be used by, for example, scheduler 116 or switch 120, or packet processor 118 of FIGS. 1A and 1B for subsequent allocation of sub-bands and subsequent transmission of packets over links of various wireless communications (e.g., access) systems described herein. In some examples, a base node may determine a UL and/or a DL allocation (they are matched for RDB) so an RN does not send information about which sub-bands/streams are allocated, but does send information, e.g., channel quality information for the allocated sub-bands.

In some examples, the information and/or content of a CCE and FCCH channel may be different in the UL and DL. For example, the DL FCCH may in some examples contain the MCS and power control information, and the UL FCCH may contain the SINR and error information per sub-band. Similarly, in some examples, the DL CCE may contain allocation information while the UL CCE may contain channel information from a node (e.g., a remote node), such as for example, overall errors, power control information, and/or many other metrics.

Figure 2:
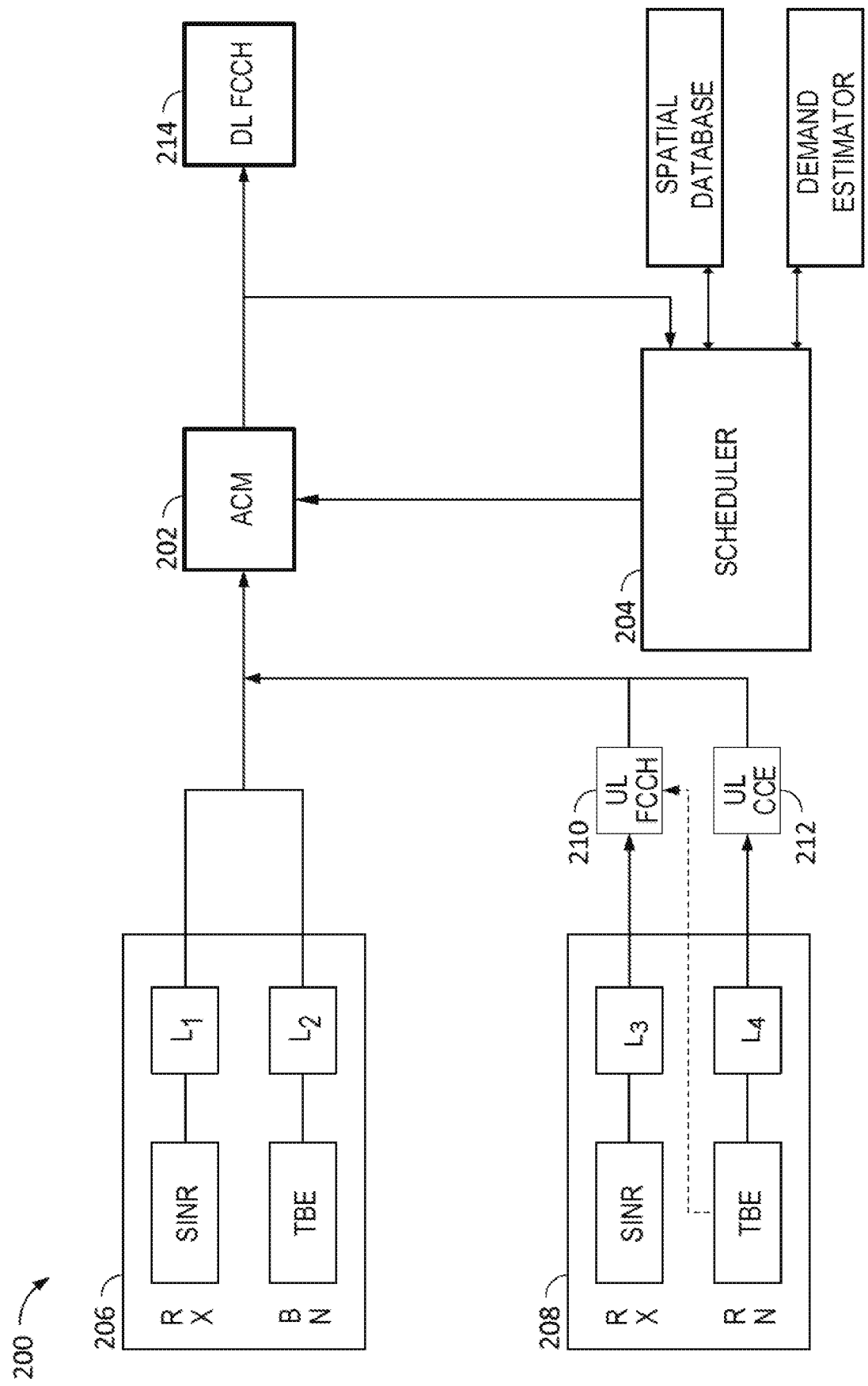
FIG. 2 is a schematic illustration of channel condition metrics, allocation information, and scheduling information used in some examples by ACM circuitry to select modulation and coding schemes, in accordance with examples described herein.

Now turning to FIG. 2, FIG. 2 is a schematic illustration of channel condition metrics, allocation information, and scheduling information used in some examples by ACM circuitry to select modulation and coding schemes, in accordance with examples described herein. As depicted, FIG. 2 includes both components as well as various information inputs of wireless communications systems described herein. As depicted, FIG. 2 includes ACM circuitry 202, scheduler 204, base node 206, and remote node 208. Scheduler 204 may include allocation information (not shown). Scheduler 204 may be coupled to (e.g., communicatively and/or otherwise) one or more spatial databases (as described in FIGS. 1A and 1B) and/or one or more demand estimators (as described in FIGS. 1A and 1B). Scheduler 204 may further include input from the spatial database and/or the demand estimator. In some examples, Scheduler 204 may make allocation decisions based at least on the spatial database, the ACM input, the demand estimator, or combinations thereof. The ACM circuitry 202 may be implemented using and/or may be used to implement the ACM circuitry 126 of FIGS. 1A and 1B, in some examples.

As depicted, and in some examples, ACM circuitry 202 may receive SINR information (e.g., uplink (UL) SINR information) at a communications node (e.g., a base node). In some examples, the SINR information may be a channel condition metric used as an input to ACM circuitry 202. Another input to ACM circuitry 202 is UL channel code error count, which as depicted in FIG. 2, is labeled transport block error (TBE). In some examples, channel code error counts (e.g., TBEs) may generally be defined as the number of blocks of information bits that are received in error. In some examples, the TBE information may be a channel condition metric used as an input to ACM circuitry 202. As depicted, and at remote node 208 (e.g., RN), the SINR and the TBE are fed back to ACM circuitry 202. Recall, in some examples, ACM circuitry 202 may be located in, coupled to, or otherwise in communication with a base node (or other nodes), such as base node 206.

In some examples, and as described herein, the SINR and the TBE (which in some examples are examples of channel condition metrics) are fed back to ACM circuitry 202 using the UL fast control channel (FCCH) and the UL control channel element (CCE). In some examples, a per-sub-band per-spatial-stream SINR and a highly compressed version of the TBE are sent in the UL FCCH channel (e.g., UL FCCH 210). In some examples, a richer version of the TBE but that is still compressed (or in some examples, that may be compressed) is sent back using the UL CCE channel (e.g., UL CCE 212). These different metrics arrive at ACM circuitry 202 with different delays. For example, the BN metrics are available at the BN faster than the RN metrics. This is depicted in FIG. 2 as latency $L_1$-$L_4$ for the different metrics.

Recall that another source of input to ACM circuitry 202 may be scheduler 204. In some examples, scheduler 204 includes or provides (e.g., stores, receives, determines, etc.) information about current allocations, upcoming allocations, and spatial information about all (or some) users within the wireless communications system. Scheduler 204 may provide such allocation information to ACM circuitry 202. In some examples, ACM circuitry 202 may process this information (in some examples, along with other information) and select a corresponding UL and DL MCS per-sub-band per-spatial-stream. ACM circuitry 202 may signal the selected UL and DL MCS per-sub-band per-spatial-stream in the DL FCCH channel to the RN. In some examples, ACM circuitry 202 may also inform scheduler 204 of the chosen (e.g., selected) MCS in order for scheduler 204 to better decide on how many sub-bands are required to meet the throughput demand for a given user of the wireless communications system described herein.

As described herein, scheduler 204 may include allocation information (in some examples, using which, it may partially base an allocation decision on). In some examples, scheduler 204 may be coupled to a spatial database (e.g., a channel database, a spatial channel database, etc.), as depicted in FIG. 2. In some examples, the channel database may contain information about one user, one or more users, and/or all users of a wireless communications system, such as wireless communications systems described herein. In some examples, the channel database may include information regarding whether two users are spatially compatible; in such example, the channel database may be considered a per-user data base. As should be appreciated, in some examples, channel database may contain information regarding how a user relates to other users.

In some examples, another reason for informing scheduler 204 is to enable evaluation of the accuracy of scheduler 204's expected throughput versus the achieved throughput. For example, if an allocation is performing below expectation, it can be removed or shifted to other sub-bands in order to ensure a high system throughput. In some examples, once ACM circuitry 202 selects the DL MCS, it may also inform the BN's channel encoder which MCS to use (referring back to FIGS. 1A and 1B, this may include modulation/demodulation encode/decoders 114). Similarly, once the RN has decoded the DL FCCH (e.g., DL FCCH 214), it informs the channel decoder (e.g., modulation/demodulation encode/decoders 114 of FIGS. 1A and 1B) of the chosen DL MCS in order to decode the message with the correct MCS.

In some examples, the channel encoder at the transmitter and the decoder at the receiver can be implemented in either software or hardware or combinations thereof. Similarly, in some examples, for the UL, the RN (e.g., remote node 208) uses the decoded DL FCCH message to determine the UL MCS and informs the channel encoder. The initial UL MCS for a new allocation may use a different scheme since there may be no DL FCCH message if the allocations starts with an UL allocation. In such examples, either a rule based on known parameters on both base node 206 and remote node 208, or explicit signaling can be used to determine the initial UL MCS (although in some examples other information may be used to make such determination). In this example, the base node 206 decides both the UL and DL MCS in order to utilize the knowledge from scheduler 204 that resides at the base node 206. As should be appreciated, additional and/or alternative implementations are possible and are contemplated to be within the scope of this disclosure, where the MCS decision can be distributed to remote node 208 and/or different combinations of ACM circuitry coupled to other base nodes and/or remote nodes.

MCS Selection Scheme

Recall that, in some examples, ACM circuitry, such as ACM circuitry 202 of FIG. 2 may select an MCS based at least on using a look up table (LUT), such as LUT 130 of FIGS. 1A and 1B. In some examples, an effective SINR for a specific MCS to achieve a specific transport block error (TBER) is stored in a look-up-table (LUT) (e.g., MCS_LUT). As stated throughout, in some examples, the MCS decision is performed for each sub-band (e.g., sb) and spatial stream or dimension (e.g., sd). Below is an example pseudo-code description of one example of the MCS selection algorithm described herein (e.g., Algorithm (1), below) where the SINR, margin (MAR), hysteresis (HYST) are all defined per-sub-band per-spatial-stream (e.g., per-stream), but to simplify notation, the sub-band and spatial dimension indices are suppressed.

---
Algorithm (1)
---
If $SINR_{eff}(n) > MCS\_LUT(MCS(n)+1) + MAR(n) + HYST(n)$
   MCS(n + 1) = MCS(n) + 1
   for loop = 2:STEP_UP_SIZE
if $SINR_{eff}(n) > MCS\_LUT(MCS(n)+loop) + MAR(n) + HYST(n)$
      MCS(n + 1) = MCS(n) +loop
    end
  end
elseif $SINR_{eff}(n) < MCS\_LUT(MCS(n)) + MAR(n)$
   MCS(n + 1) = MCS(n)-1
   for loop = 2:STEP_DOWN_SIZE
     if $SINR_{eff}(n) < MCS\_LUT(MCS(n) - loop + 1) + MAR(n)$
       MCS(n + 1) = MCS(n)-loop
     end
   end
else
   MCS(n + 1) = MCS(n)
end
MCS(n + 1) = min[MCS(n + 1),$MCS_{max}$,$MCS_{rem}$ + $MAX_{diff}$]
MCS(n + 1) = max[MCS(n + 1),$MCS_{min}$]

---

As depicted above in Algorithm (1), the index n refers to the current frame and n+1 refers to the next frame. In some examples, if the effective SINR exceeds the LUT value for the next MCS plus the margin and hysteresis, the MCS is increased. In some examples, the MCS is increased all the way up to a current MCS plus the maximum step up size if the SINR is large enough. On the other hand, in some examples, if the SINR is lower than the LUT for the current MCS plus the margin without the hysteresis, the MCS is decreased. In some examples, the MCS is decreased all the way down to the current MCS minus the maximum step down size if the SINR is small enough.

In some examples, additional steps may be used (not shown) to handle edge conditions such as if the index exceeds the length of the LUT. In some examples, checks may be performed (e.g., by one or more components of the wireless access system described herein) to ensure that a maximum or minimum MCS is not exceeded. In some examples, given that the BN selects both the UL and DL MCS, difference between UL and DL MCS is restricted to not exceed a certain limit using the other link direction MCS (labeled MCS REM in the Algorithm (1)).

Effective SINR Calculation

In some examples, an effective SINR is a metric (e.g., a channel condition metric) used for MCS selection by, for example, ACM circuitry 202 of FIG. 2. Many implementations of the fine-grained SINR information are possible. In some examples, the effective SINR may be the reported reference symbol (RS) SINR for the current sub-band and spatial dimension. However, there may be reasons to change the granularity by combining multiple sub-bands or spatial dimensions into one MCS decision despite that feedback channels such as FCCH are capable of finer granularity.

In some examples, in practical wireless systems there are also several reasons why the effective SINR might change during a frame. For example, the RN might be mobile so the SINR estimate in the beginning of the frame from the RS-SINR might be quite different from the effective SINR at the end of the frame. Another reason that the SINR might change during the frame is phase noise that may reduce the SINR across the frame. Yet another reason is burst interference on portions of the frame. Referring briefly to FIG. 3, this may be one reason why the frame structure in FIG. 3 also has pilots inserted across the frame to estimate the SINR across the frame to detect these possible SINR changes. In some examples, as the carrier frequency error increases, its corresponding effect on effect on the payload achieved SINR becomes more important. This SINR is called the pilot based SINR or P-SINR and is typically equal or less than the RS-SINR.

An example of an effective SINR would be to simply select the RS-SINR as:

$$SINR_{eff}(n) = RS\text{-}SINR(n-L_{11}) \qquad \text{Equation (1)}$$

where the delay $L_{11}$ denotes the delay of the RS-SINR computation. In some examples, a better performing effective SINR than just the RS-SINR in some examples may be a combination of the RS-SINR and the P-SINR. One scheme would be to select the minimum out of the two as:

$$SINR_{eff}(n) = min[RS\text{-}SINR(n-L_{11}), P\text{-}SINR(n-L_{12})] \qquad \text{Equation (2)}$$

where the delay $L_{12}$ denotes the delay of the P-SINR.

In some examples, in order to maximize payload throughput, there may be a desire to minimize the number of subcarriers used to transmit the pilots from which the P-SINR is estimated. Accordingly, in some examples, the P-SINR estimate may have a higher variance and standard deviation due to a limited number of pilots.

A high standard deviation in the P-SINR while using Equation (2) may lead to a high standard deviation in the $SINR_{eff}$ and thus also the selected MCS which may be undesirable. In some examples, a better choice may be to post-process the P-SINR to reduce the variance at the cost of less fine-grained P-SINR. This may be accomplished by computing (e.g., using one or more components of system 100 described herein) the minimum of P-SINR across multiple symbols, which also reduces the number of P-SINRs used by ACM circuitry (such as ACM circuitry 202 of FIG. 2) to one per-sub-band per-spatial-stream. The minimum captures P-SINR reductions due to external interference or phase noise in a fine-grained manner.

In some examples, one drawback of that computation may be that the minimum can be lower than the RS-SINR due to the variance alone. In some examples, a slightly more advanced scheme is to compute the $i^{th}$ order statistic across multiple symbols, which limits the variance while trading for less fine-grained P-SINR. In some examples, a yet more advanced option is to combine the $i^{th}$ order statistic with a threshold that only activates the P-SINR if it is more than a pre-defined amount smaller than the RS-SINR. These schemes can be combined with processing across sub-bands. Note that in some examples, the P-SINR may not be independently signaled between the RN and BN so it is not part of standards definitions and can have low latency.

For highly dynamic systems in where a sub-band only may be allocated a single or a few frames, the amount of available averaging or statistics collection may be limited. A method offering substantial variance reduction and low computational cost is to average across all sub-bands, all spatial dimension, as well as over a number of frames. One example of that is to compute a long-term offset from the RS-SINR as:

$$SINR_{offset}(n) = \frac{1}{N_n N_{sb} N_{sd}} \sum_{k=n-N_n+1}^{n} \sum_{sb \in SB} \sum_{sd \in SD} RS\text{-}SINR(k, sb, sd) - P\text{-}SINR(k, sb, sd)$$

Equation (3)

where $N_n$ denotes the number of frames that are averaged, SB denotes the set of allocated sub-bands, SD denotes the allocated spatial dimensions, and $N_{sb}$ and $N_{sd}$ denotes the cardinality of the sets SB and SD. If the allocated sub-bands and spatial dimensions vary across frames, the average needs to be updated appropriately with recursive averaging techniques. The effective SINR may then be calculated (using various components of system 100 described herein), such as ACM circuitry 202, as:

$$SINR_{eff}(n) = RS\text{-}SINR(n-L_1) - SINR_{offset}(n)$$

Equation (4)

where the offset may be based on the average distance between the RS-SINR and P-SINR as defined above. As should be appreciated, additional and/or alternative versions of this may be possible with different sub-band and spatial dimension granularity. As should further be appreciated, this may be computed by ACM circuitry 202 across all sub-bands and streams, as well as some time duration (e.g., frames). In some examples, additional and/or alternative components of system 100 may perform such calculations.

Hysteresis Selection

Recall that in some examples, ACM circuitry 202 of FIG. 2 may select an MCS based at least on a hysteresis (such as Hysteresis 132 of FIGS. 1A and 1B). Selecting the hysteresis in the ACM algorithm may generally control various aspects of the system performance. In some examples, the purpose of the hysteresis is to reduce (e.g., prevent) the MCS to jitter between two adjacent MCSs, which may be detrimental in several ways. The jitter in the SINR estimate may increase the error rate by occasionally reporting too high of an SNR that results in a higher MCS than can be supported. Another aspect of hysteresis is that it may increase the variation in the supported bit rate that interacts in a complicated manner with various traffic protocols such as TCP. In some examples, ACM circuitry, such as ACM circuitry 202 of FIG. 2 may perform hysteresis selection as described herein. In some examples, additional and/or alternative components of system 100 may perform such calculations.

In some examples, the hysteresis can be selected by studying its impact on throughput and error rates (either during operation of a system and/or operation of other systems prior to configuration of a particular system) and tune to the best overall hysteresis across all traffic and channel conditions. In some examples, another option is to determine the optimal switching rate and then compute the required hysteresis based on the variance of the effective SINR.

Below is a derivation of the switching rate as a function of the distance between neighboring MCS levels in the LUT 8, the hysteresis h, the standard deviation a of the effective SINR, and x, the mean effective SNR minus the lookup table at the lower MCS minus the margin. The below analysis reveals that the maximum switching rate may occur at x=h/2. Since error rates may be dominated by the outliers, one option for selecting the hysteresis is to operate a hypothetical channel at x=h/2 and compute the required hysteresis to achieve a specific switching rate. Many different techniques to numerically solve for h may be formulated including non-linear search techniques. A benefit of this derivation may be that the switching rate can be kept below a specified maximum by adapting the hysteresis depending on a that is known to the system or can be estimated.

In some examples, a hysteresis may be tuned based at least on observed behavior of the system (e.g., system 100) in real radio channels. For example, too small hysteresis may lead to too much jitter which may lead to low throughput but too large hysteresis may lead to lower MCS and thus also lower throughput. The derivation may reveal the behavior of the jitter such that it is maximized at h/2 and the relationship with the standard deviation.

Figure 7:
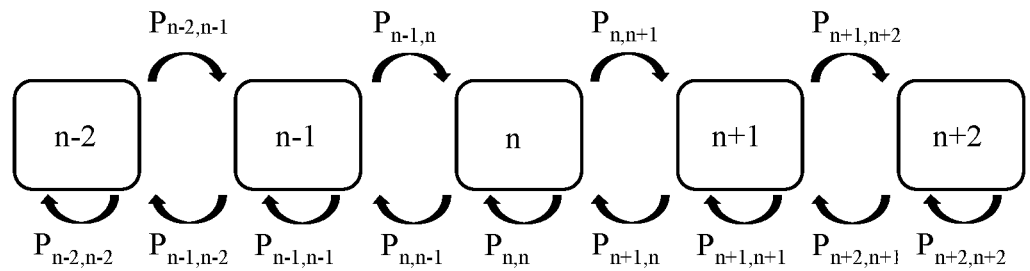
FIG. 7 is a schematic illustration of a state diagram of MCS selection with state transition probabilities, in accordance with examples described herein.

In some examples, it is possible to analyze the MCS hysteresis by treating each MCS as a state and the system of MCSs as a Markov chain. Define the current MCS level as n and consider two MCS levels up and down as shown in the below. Further define state transition probabilities based on the SINR thresholds for each MCS $T_n$, the hysteresis h, the mean and standard deviation $\sigma$ of the SINR. The state transition probabilities are also indicated in FIG. 7, which is a state diagram of MCS selection with state transition probabilities. In some examples, a Gaussian distribution is assumed with a relatively small standard deviation, then only two MCSs away from the target MCS are considered. In some examples, only a maximum MCS change of one is considered since for steady state operation and with a relatively small standard deviation, it is uncommon to change more than one MCS at a time.

As depicted in the diagram of Diagram FIG. 7, five states are considered (e.g., n−2, n−1, n, n+1, and n+2). Considering the five states, the transition to the P matrix becomes:

$$P = \begin{bmatrix} P_{0,0} & P_{0,1} & 0 & 0 & 0 \\ P_{1,0} & P_{1,1} & P_{1,2} & 0 & 0 \\ 0 & P_{2,1} & P_{2,2} & P_{2,3} & 0 \\ 0 & 0 & P_{3,2} & P_{3,3} & P_{3,4} \\ 0 & 0 & 0 & P_{4,3} & P_{4,4} \end{bmatrix}$$

Figure 8:
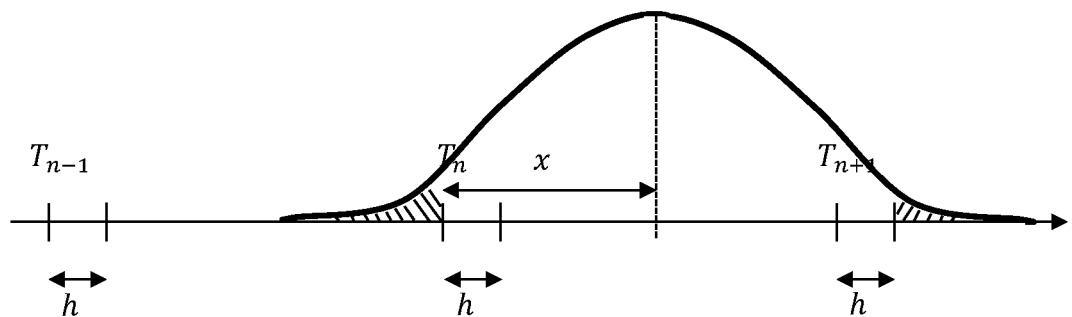
FIG. 8 is a schematic illustration of a SINR error distribution with transitional levels of hysteresis, in accordance with examples described herein.

With the transition matrix defined, the steady state probability of all the states can be computed as $$P_\infty = \lim_{n \to \infty} P^n$$

where in most cases the result converges relatively quickly. The average transition rate can then be calculated for state n=2 as:

$$Tr_{ave} = P_\infty(3, :)\text{diag}(1-P)$$

where $P_\infty(3, :)$ denotes the third row of the matrix $P_\infty$. To calculate the transition rate, the transition probabilities are required. For tractability, assume that the SINRs are Gaussian distributed with a mean of $T_n+x$ where $T_n$ denotes the SINR threshold including any margin and x denotes the offset from the switching point as illustrated in the diagram of FIG. 8. The threshold difference between the MCSs is defined as $\delta = T_{n+1} - T_n$ and is the same between all the states in the following analysis.

Consider a current MCS n=2, then using the diagram of FIG. 8, it is clear that the transition probability marked by diagonal lines on the right-hand side of the curve becomes:

$$P_{2,3} = \frac{1}{\sqrt{2\pi}\,\sigma}\int_{\delta+h-x}^{\infty} e^{-\frac{x^2}{2\sigma^2}}\,dx = Q\left(\frac{\delta+h-x}{\sigma}\right) = 1/2\,\text{erfc}\left(\frac{\delta+h-x}{\sqrt{2}\,\sigma}\right)$$

where Q ( ) denotes the q-function and erfc ( ) the matlab definition of the error function. Similarly, the probability of stepping down from n=2 to n=1 marked by diagonal lines on the left-hand side of the curve of the diagram in FIG. 8 can be expressed as:

$$P_{2,1} = \frac{1}{\sqrt{2\pi}\,\sigma}\int_{-\infty}^{-x} e^{-\frac{x^2}{2\sigma^2}}\,dx = 1 - Q\left(\frac{-x}{\sigma}\right) = 1 - 1/2\,\text{erfc}\left(\frac{-x}{\sqrt{2}\,\sigma}\right)$$

The probability of staying at n=2 can then easily be expressed as a SINR error distribution with transitional levels of hysteresis, h, seen in the diagram of FIG. 8.

The remaining transition probabilities are listed below:

$$P_{0,0} = 1 - P_{0,1}$$

$$P_{0,1} = 1 - Q\left(\frac{-x-\delta+h}{\sigma}\right) = \frac{1}{2}\text{erfc}\left(\frac{-x-\delta+h}{\sqrt{2}\,\sigma}\right)$$

$$P_{1,0} = 1 - Q\left(\frac{-x-\delta}{\sigma}\right) = 1 - \frac{1}{2}\text{erfc}\left(\frac{-x-\delta}{\sqrt{2}\,\sigma}\right)$$

$$P_{1,1} = 1 - P_{1,0} - P_{1,2}$$

$$P_{1,2} = 1 - Q\left(\frac{-x+h}{\sigma}\right) = \frac{1}{2}\text{erfc}\left(\frac{-x+h}{\sqrt{2}\,\sigma}\right)$$

$$P_{2,1} = 1 - Q\left(\frac{-x}{\sigma}\right) = 1 - \frac{1}{2}\text{erfc}\left(\frac{-x}{\sqrt{2}\,\sigma}\right)$$

$$P_{2,2} = 1 - P_{2,1} - P_{2,3}$$

$$P_{2,3} = 1 - Q\left(\frac{\delta-x+h}{\sigma}\right) = \frac{1}{2}\text{erfc}\left(\frac{\delta-x+h}{\sqrt{2}\,\sigma}\right)$$

$$P_{3,2} = 1 - Q\left(\frac{\delta-x}{\sigma}\right) = 1 - \frac{1}{2}\text{erfc}\left(\frac{\delta-x}{\sqrt{2}\,\sigma}\right)$$

$$P_{3,3} = 1 - P_{3,2} - P_{3,4}$$

$$P_{3,4} = 1 - Q\left(\frac{2\delta-x+h}{\sigma}\right) = \frac{1}{2}\text{erfc}\left(\frac{2\delta-x+h}{\sqrt{2}\,\sigma}\right)$$

$$P_{4,3} = 1 - Q\left(\frac{2\delta-x}{\sigma}\right) = 1 - \frac{1}{2}\text{erfc}\left(\frac{2\delta-x}{\sqrt{2}\,\sigma}\right)$$

$$P_{4,4} = 1 - P_{4,3}$$

Figure 9:
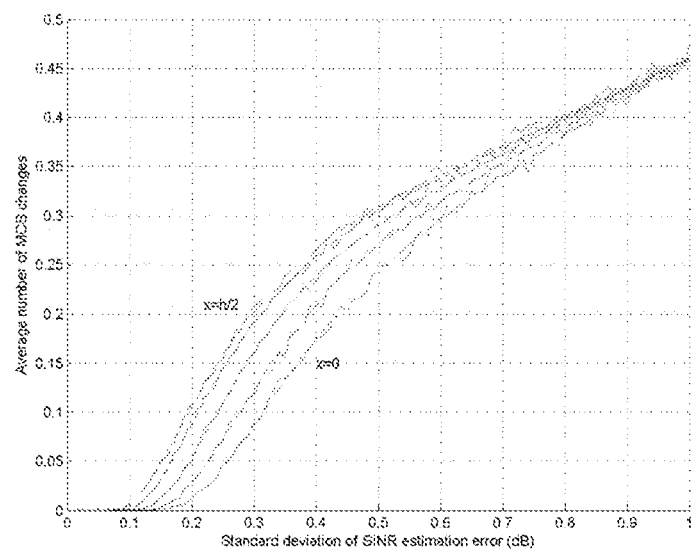
FIG. 9 is a schematic illustration of simulation results that depict the average number of MCS changes versus standard deviation of SINR estimation error, in decibels, in accordance with examples described herein.

Simulation results using the above equations are shown in the diagram shown in FIG. 9 for the case of δ=1.5 dB and h=0.5 dB. FIG. 9 is a diagram which depicts the average number of MCS changes versus standard deviation of SINR estimation error, in decibels. The dashed curves show the theoretical result while the solid curves are simply the average over 10000 random realizations and applying the ACM algorithm described herein. It is clear that the theoretical results match the simulated results well. Several scenarios where the mean of the Gaussian distribution was varied are included in FIG. 9. The number of transitions increases as x grows from 0 to h/2, as shown in FIG. 9. After h/2, the number of transitions decrease again.

Figure 10:
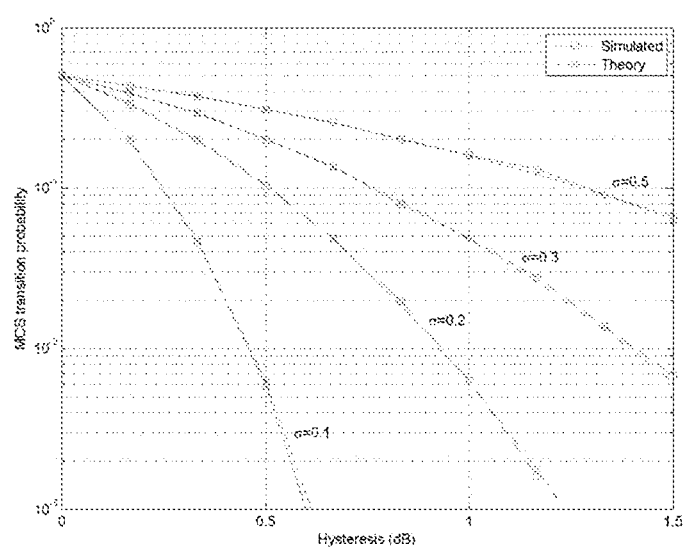
FIG. 10 is a schematic illustration of MCS transition probabilities for different hysteresis and standard deviations, in accordance with examples described herein.

The MCS transition probabilities for different hysteresis and standard deviations are shown in the diagram in FIG. 10 where both the simulated and theoretical values are shown. For an SINR estimation error standard deviation of 0.2 dB, selecting a hysteresis of 0.5 dB gives about a 10% MCS change or about once every 20 frames assuming a frame rate of 200 frames per second. In some examples, the diagram of FIG. 10 and corresponding analysis may be useful as a design tool when deciding the amount of hysteresis to use.

Margin Selection

Recall that in some examples, ACM circuitry 202 of FIG. 2 may select an MCS based at least on a margin, e.g., margin 134 of FIGS. 1A and 1B. Similar to hysteresis, the margin in the ACM algorithm may generally impact various aspects of the system performance In some examples, the overall error rate can be controlled by selecting the margin, e.g., margin 134 of FIGS. 1A and 1B, appropriately. By selecting a larger margin the overall error rates may decrease and correspondingly for a smaller margin. In some examples, a drawback of selecting a larger margin for a low error rate is that the selected MCS (e.g., selected by ACM circuitry 202) may be lower, which may lower the capacity of the system. Accordingly, in some examples, the selected margin may represent a trade-off between capacity and error rate. In some examples, systems described herein may tune the margin based on simulations and measurements to select a margin that yields good performance on average. The margin may be calculated and selected during operation and/or may be preconfigured in a system. In some examples, the margin may be adapted during operation to current conditions. As should be understood, and as discussed herein, hysteresis may also impact the same or similar error versus capacity trade-off, and in some examples, a large hysteresis may allow for lower margin. In some examples, for optimal performance, both the margin and hysteresis can be optimized in terms of error rate and capacity but also different types of data traffic.

Adaptive Margin

As discussed above, in some examples, margin may be adapted to the current conditions. In some examples, the performance of a selected MCS based on a LUT (e.g., LUT 130 of FIGS. 1A and 1B) with fixed margin and hysteresis may depend on the LUT parameters to accurately reflecting the current channel conditions. Basing the table on SINR alone may ignore other sources of errors that might contribute a higher TBER. Better performance may be achieved in some examples by adjusting (e.g., adapting) the margin and/or hysteresis based on other channel condition metrics such as for example observed error rates. The granularity of an adaptive margin may depend on the allocation structure.

In examples described herein, a single margin (e.g., margin 134 of FIGS. 1A and 1B.) may be computed for all sub-bands and spatial dimensions allocated to a user. This may enable statistics collection for rapid error feedback even in very dynamic allocation environments with relatively few sub-bands allocated. The following description focuses on this example, but the algorithm is also applicable to systems where a separate margin is used for groups of sub-bands or even a separate margin per-sub-band per-spatial-stream. This is straightforward at the BN where the UL errors may be local to the ACM algorithm but the DL errors need to be conveyed from RN to the BN. Different feedback strategies are discussed later but first different algorithms for adapting the margin to achieve a target error rate are presented.

In some examples, achieving a target TBER metric is desirable for adaptive margin selection. The basic idea behind a TBER based adaptive margin is to monitor the TBEs and transport blocks (TBs) and increase the margin if the errors exceed a threshold and correspondingly decrease the margin if the errors are below a lower threshold. Aside from the feedback aspect the same discussion applies to both the UL and DL adaptive margin.

As should be appreciated, while target TBER metrics are discussed with respect to determine an adaptive margin selection, other target metrics may be used with a similar adaptation scheme. In some examples, depending on the system codec, other metrics may be available. For low-density parity-check (LDPC) codes, the number of corrected bits and iterations can provide information about the operating point before actually taking errors, which is a powerful tool to achieve low error rates. Similar metrics are often available for other codecs. However, in some examples, a benefit of operating on the transport block errors (TBE) in some examples is that the TBE is not directly related to traffic and packet sizes making a low complexity implementation possible.

Below is example pseudo-code (e.g., Algorithm (2)) that illustrates an example implementation of adaptive margin selection discussed herein, and more particularly, pseudo-code for adaptive margin based on transport block error rate counters. In some examples, a TBE counter of modulation/demodulation encode/decoders 114 may provide the error count input to the adaptive margin algorithm (e.g. Algorithm 2) pseudo-code which is implemented in the ACM circuitry in 126.

---
Algorithm (2)
---
Update increase and decrease counters based on results from last frame
    TBLOCK = TBLOCK + TBLOCK_DELTA
    TBLOCK_ERR = TBLOCK_ERR + TBLOCK_ERR_DELTA
Check if thresholds have been exceeded and modify margin if needed
If TBLOCK_ERR > N_ERR_INC
    MAR = min [MAR+ MAR_STEP_UP, MAR_MAX]
    TBLOCK_ERR = 0
    TBLOCK = 0
elseif TBLOCK_ERR < N_ERR_DEC & TBLOCK > N_TBLOCK
    MAR = max [MAR- MAR_STEP_DWN, MAR_MIN]
    TBLOCK_ERR = 0
    TBLOCK =0
elseif TBLOCK > N_TBLOCK
    TBLOCK_ERR = 0
    TBLOCK = 0
end
---

As depicted above in Algorithm (2), TBLOCK denotes the TB counter, TBLOCK_DELTA denotes the number of transport blocks since last update. The error counter and the corresponding update are denoted as TBLOCK_ERR and TBLOCK_ERR_DELTA. Although Algorithm (2) may be compatible with any update rate, in some examples, the preferred update is every frame. In some examples, if the error counter exceeds the increase margin threshold N_ERR_INC, the counters may be reset and the margin may be increased by MAR_STEP_UP but not beyond the maximum margin MAR_MAX Correspondingly, if the number of TBs exceed the adaptive margin block size N_BLOCK and the errors are below the decrease margin threshold N_ERR_DEC, the counters may be reset and the margin may be decreased by MAR_STEP_DWN but not below the minimum margin MAR_MIN. Finally, if the number of TBs exceed the adaptive margin block size N_TBLOCK but the errors are in between the increase and decrease thresholds, the counters may be reset and the error collection may start over. The fact that, in some examples, the margin may be increased as soon as the error target is exceeded may result in a rapid increase in margin when there are errors since action is taken before the block size N_TBLOCK is met. In some examples, this avoids taking errors for long periods of time before increasing the margin when the channel conditions deteriorate.

In some examples, Algorithm (2) may be applicable to both UL and DL margins. Note that, in some examples, the BN may generally not have access to the number of DL TBEs and a feedback mechanism may be used in order for the BN to update the DL margin. As mentioned herein, the adaptive margin concept may be applicable to any granularity but the description focuses on the case of a per-user margin. For that case, the RN feeds back the total number of TBE for a user to the BN using the UL CCE channel. In some examples, for broadband access systems, large number of TBs may be sent per frame. Using a direct encoding of the TBE may require a large number of bits that may exceed the capacity of the UL CCE control channel.

In order to reduce the feedback while maintaining accurate information of the number of TBEs, a compression technique may be employed in some examples. A compression technique is outlined below in Algorithm (3) using pseudo-code for transport block error counter compression encoding and decoding. Algorithm (3) may be used with wireless communications system described herein, such system 100 of FIGS. 1A and 1B.

---
Algorithm (3)
---
Encode
    x= TBLOCK_ERR_ DELTA /N;
    y=(1/log(1+c))*log(1+c*abs(x));
    TBE_QUANT=round(y/(2^-b));
Decode
    yq=TBE_QUANT *2^-b;
    xq=(exp(abs(yq)*log(1+c))-1)/c;
    TBE_REC=min(round(N*xq),N);
---

At the RN, the TBE counter update TBLOCK_ERR_DELTA may be encoded by first dividing by N to reduce the overall range and then logarithmically compressed based on parameter c. The final output may be then quantized to b bits. Once the TBE_QUANT bits are received at the BN, the count may be expanded based on the number of bits b and exponentially mapped using the same parameter c. Finally, the received TBE count may be computed by scaling up by the same parameter N and then rounded to an integer. Different parameter choices results in different amounts of compression and accuracy. In some examples, selecting N=2304, c=512, and b=7 may result in lossless coding of the number of TBEs up to 21 TBEs while keeping the relative error below 5%.

In some examples, using both computer simulation and TDD retro-directive beamforming (RDB) systems with dynamic allocations in time, frequency, and/or space radio-frequency links shows that the above algorithms maintain the desired TBER that can be approximated as TBER= (N_ERR_INC+N_ERR_DEC)/(2*N_TBLOCK). In some examples, selecting the three thresholds helps provide control of not only the TBER but also the system behavior in terms of convergence and switching rates. The maximum and minimum margins further provides control of system behavior.

In some examples, an unfortunate characteristic of radio channels is that there can be bursts of errors due to channel behaviors such as objects moving and changing the radio channel but also external interference. In such cases, the adaptive margin will rapidly increase and after the error burst is gone, the margin will decrease but at a slower rate since each down step requires N_TBLOCK TBs to be accumulated. Given that the rate that TBs are accumulated depends on the allocation size, smaller allocations might be slow to return the adaptive margin to its nominal value. A characteristic of recovering from error events is that the margin is decreased many times in a row. Hence, an algorithm can be designed that adjusts the margin more rapidly if multiple reductions in margin has occurred. There are many different implementations of this that are possible such as increasing the down step size with the number of consecutive down adjustments, e.g., an adaptive step size.

Another implementation is to reduce the block size with the number of consecutive down adjustments, e.g., an adaptive block size. An updated version the pseudo-code for adaptive margin based on transport block error counters and adaptive block size is shown below in Algorithm (4).

---

Algorithm (4)

---

Update increase and decrease counters based on results from last frame
    TBLOCK = TBLOCK + TBLOCK_DELTA
    TBLOCK_ERR = TBLOCK_ERR + TBLOCK_ERR_DELTA
Check if thresholds have been exceeded and modify margin if needed
    N_BLOCK_RED = LUT(RED_CNTR)
    If TBLOCK_ERR > round(N_ERR_INC/N_BLOCK_RED)
        MAR = min [MAR+ MAR_STEP UP, MAR_MAX]
        TBLOCK_ERR = 0
        TBLOCK = 0
        RED_CNTR = 1
    elseif TBLOCK_ERR < ceil(N_ERR_DEC/N_BLOCK_RED) ...
        & TBLOCK > ceil(N_TBLOCK/N_BLOCK_RED)
        MAR = max [MAR–MAR_STEP_DWN, MAR_MIN]
        TBLOCK_ERR = 0
        TBLOCK = 0
        RED_CNTR = RED_CNTR + 1
    elseif TBLOCK > ceil(N_TBLOCK/N_BLOCK_RED)
        TBLOCK _ERR = 0
        TBLOCK = 0
        RED_CNTR = 1
end

---

In some examples, if the margin is adjusted (e.g., adapted) down, the block size may be reduced by increasing a reduction counter RED_CNTR that then maps into a look-up-table. For example, for the first down adjustment the block size v reduced by a factor of two and after five down adjustments the block size may be reduced by a factor of 12. Note that, in some examples, the increase and decrease thresholds may be adjusted correspondingly to maintain the target TBER unless large reductions are used where the number of errors thresholds are severely quantized. In some examples, it is important to have a ceil operation on the reduce error threshold rather than a round in order to avoid a comparison with zero when "N_BLOCK_RED" is large. If there is a margin increase or the errors are in between the thresholds, the reduction counter may be reset. Other similar implementations are possible where the LUT (e.g., LUT 130 of FIGS. 1A and 1B) is replaced with a list of counter thresholds and a corresponding reduction list if the respective thresholds are exceeded. The proposed algorithms discussed herein are applicable to many other scenarios where it is desired to decrease the recovery time after an error event or other cases where a margin needs to be substantially reduced. In some examples, the improvement in recovery may be directly proportional to the reduction factor used in the LUT (e.g., LUT 130 of FIGS. 1A and 1B) and the rate of modifying the reduction factor.

For the adaptive margin described above, a default starting margin is selected and for users with long periods of inactivity, the margin is reset to the default.

Granularity Optimization

Recall that MCS selection by, for example, ACM circuitry 202 of FIG. 2, may be closely related to the chosen codec since the selected MCS may determine the modulation and the amount of coding that is applied, which may affect the number of bits and sub-bands the encoded bits are transmitted on. For wireless systems with one MCS for the whole allocation such as LTE, the encoding spreads the bits from a single code block across all the sub-bands despite different channel conditions at the different sub-bands. For fine-grained MCS selection schemes, it is possible to separate a large allocation into many smaller blocks of which each one is encoded separately. Each one of this smaller frequency blocks, has a separate MCS and spans a set of contiguous sub-bands that are considered grouped together. The blocks of encoded bits using a specific MCS, e.g. transport blocks (TBs), are then mapped across those sub-bands.

Figure 5:
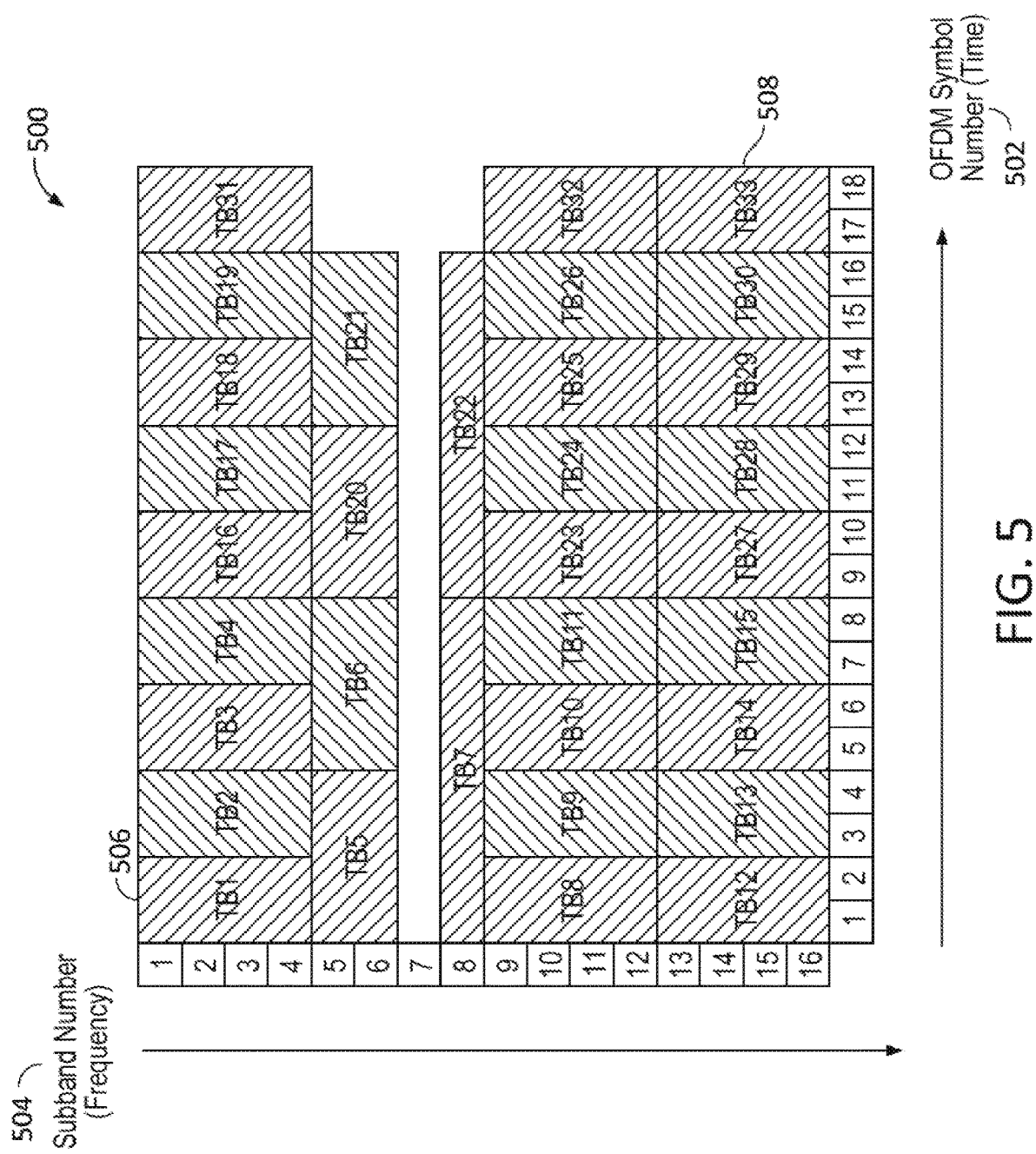
FIG. 5 illustrates transport block mapping sub-bands and reference symbols, in accordance with examples described herein.

Referring briefly to FIG. 5, FIG. 5 is an example of such a mapping or striping. A modem packet may be mapped into potentially many transport blocks. This mapping scheme may be optimized based on channel conditions and hardware capability. Hence, one transport block may span one or many contiguous sub-bands and a different number of OFDM symbols. Thus, there may be a need to find an MCS that yields the desired error rate when the coded bits are sent over multiple sub-bands with potentially different channel conditions. Many metrics may be used to quantify channel conditions of which the one used in the example system is the effective SINR computed from the RS-SINR and P-SINR. To determine a single MCS (e.g., by ACM circuitry 202 of FIG. 2) for multiple sub-bands, many techniques can be used.

For broadband wireless access systems such as LTE and WiMAX, different non-linear mappings such as mutual information (MI) or exponential effective SINR mapping (EESM) based schemes are typically used. The optimal mapping clearly depends on the chosen codec and its implementation. For the LDPC code used in the example system it was found that a reciprocal average technique closely matched the codec performance for all MCSs:

$$SINR_{eff} = 10\log_{10}\left[\cfrac{1}{\cfrac{1}{N_{sb}}\sum_{b=1}^{N_{sb}} 10^{-\cfrac{SINR(b)}{10}}}\right] \quad \text{Equation (5)}$$

where $N_{sb}$ denotes the number of sub-bands that are grouped together, $SINR(b)$ is the SINR for sub-band b in the units of dB, $SINR_{eff}$ is the corresponding effective SINR in units of dB that then is used for MCS selection. This metric has the benefit of being simpler to compute in some examples than most MI or EESM techniques. Another possible scheme that is more conservative is to select the ith order statistic of the RS-SINR.

One benefit of grouping several sub-bands together for transmitting a transport block in some examples is that the variance of the SINR estimator is reduced. Another benefit in some examples of grouping several sub-bands in the example system is that the same bits are sent from multiple FCCH sub-bands that effectively lowers the code rate and improves the robustness of the FCCH codec through code diversity. From Equation (5) note that the more sub-bands are reciprocal averaged, the lower the variance. A lower SINR variance allows for lower margins and thus also higher capacity. On the other hand, grouping too many sub-bands makes the solution less fine-grained and less capable to adapt to different channel conditions per-sub-band per-spatial-stream. However, just like in wireless broadband access system such as LTE and WiMAX, coding across different channel conditions allows for extracting frequency diversity that partially offsets this loss of granularity.

Dynamic MCS Based on Spatial Information and Allocation Information

Recall that, in some examples, ACM circuitry 202 may select an initial MCS based on allocation information and spatial information. In some examples, a typical implementation of a TDD RDB system may initiate a new allocation by an UL transmission in a first frame followed by both an UL and DL transmission in subsequent frames. Given that in some examples, the first few frames may not have feedback due to the latencies (e.g., $L_1$-$L_4$) a different mechanism, as described throughout (e.g., use of spatial information and/or allocation information), may be used until feedback (e.g., channel condition metrics) is available at ACM circuitry 202.

A powerful feature of a fine-grained MCS (such as an MCS selected by ACM circuitry 202 of FIG. 2 using methods described herein) is the ability to connect the MCS selection with a scheduler (e.g., scheduler 204 of FIG. 2) and channel state information. In some examples, several performance improvements are possible in some examples in a dynamic allocation environment with spatial multiplexing between users as well as multiple spatial dimensions per user. Many of these benefits are tied to a knowledge of the channel state information (CSI) at the RN and BN in the form of a spatial channel database (e.g., spatial database 124 of FIGS. 1A and 1B).

In some examples, there may be various ways of obtaining this database. In one example, it may be to transmit a known DL sounding signal from the BN. In another example, it may be to use the spatial structure of the received broadcast channel. Regardless of the method of obtaining the CSI, all RNs estimate their channels and send those back to the BN to form a database at the BN. In some examples, if the BN also announces the DL transmit power in a broadcast channel, the RN can estimate the pathloss or power-loss and feed that back to the BN. For the system 100 describe herein, the DL sounding signal is sent on the last DL symbols. An UL sounding signal can also be employed to complement or replace the feedback. In some examples, using the information stored on the spatial channel database, several important features can be implemented.

As one example, when scheduling a new allocation on a set of sub-bands (e.g., using scheduler 116 of FIGS. 1A and 1B and/or scheduler 204 of FIG. 2), the scheduler may load the per-user spatial channel from a data-base. If it is the first spatial dimension on a sub-band, a base SINR may be computed from the database based on the pathloss and used to select the MCS for the initial frames until the BN receives SINR feedback. For allocations that only stay up for a short time, the ability to start at the desired MCS provides a large performance improvement.

As another example, when scheduling a new allocation on sub-bands that already have allocations either from different users or other spatial dimensions from the same user (e.g., using scheduler 116 of FIGS. 1A and 1B and/or scheduler 204 of FIG. 2), the initial MCS computation may need to be different. With knowledge of the spatial properties of the other spatial channels that are spatially multiplexed, a predicted SINR can be computed. In some examples, there are various ways of computing this SINR using the spatial database. One possible method that is of relatively low complexity is to compute the similarity or correlation between users. For example, the correlation between dominant eigenvectors of the different user's channels can be used to compute the SINR impact. Other methods, of varying complexity, based on the azimuth difference or GPS location of users can also be used to predict the SINR impact of the allocation change. This predicted SINR can also be combined with the base SINR to arrive at the initial MCS. For a dynamic system with many users and spatial dimensions that are different per-sub-band per-spatial-stream or group of sub-bands, this feature can considerably improve the performance. Many mappings of correlation into an SINR prediction can be considered such as pair-wise correlations, multi-dimensional correlations or non-linear mappings to compute the predicted SINR based on the channel database. A feature of this in some examples is that not only can the initial SINR be predicted for a new user or spatial dimension, the SINR impact of a new user or spatial dimension on the existing allocations can also be predicted. Hence, if adding a new allocation reduces the SINR of the existing users, it can be predicted in advance and the MCS is adjusted accordingly for those users without incurring TBEs. That is a very important ACM component in a dynamic high throughput system.

In another example, after a few frames, the SINR feedback for a new allocation becomes available to the BN's ACM algorithm and the MCS is adjusted away from the initial MCS value. When no predicted SINR is available or inaccurate, it can take several frames of MCS step-ups to arrive at the appropriate MCS. For example, if the initial MCS is selected as 0 but the SINR feedback indicates that MCS 12 can be supported it would take 12 frames to arrive at MCS 12 if STEP_UP_SIZE=1. For short allocations this can negatively impact throughput. One way of making the ACM more responsive is to increase the step size at the first frame when the SINR feedback is available. In the example above, assuming that it takes two frames to receive the SINR feedback and a step size on this particular frame of 12, the average MCS for the first 14 frames would be 10.3 using this feature compared to 5.6 using a fixed step size of one. That corresponds to doubling the throughput. For allocations of even shorter duration, the gain can be even higher. For six frames, the improvement is a factor of five.

In another example, in a TDD RDB based system the initial transmit beamforming weights may be selected based on the spatial channel database. In some examples, doing so may improve the convergence rate of the retro-directive beamforming which ultimately impacts the convergence of the SINR and thus also the MCS and throughput. Still the convergence rate will depend on the existence of other spatial users at the same sub-band. This convergence rate can be predicted using the current weights and the spatial database. Other systems parameters and control systems can also impact the convergence rate. With a predicted convergence rate, the MCS can be adjusted pre-emptively compared to waiting for SINR feedback before adjusting the MCS. Doing so may further improve the throughput.

In another example, the performance improvement with a predicted SINR may depends on the accuracy of the MCS prediction. Correlation based approaches may yield accurate predictions but many other approaches such as mutual information (MI), exponential effective SINR mapping (EESM) can also be used. Concepts from machine learning, artificial intelligence, and neural networks can also be applied. Even a simple scheme such as asking the scheduler to report the average prediction error, average it, and then applying it to the prediction to reduce the average error. In some example, this scheme may be effective in removing bias in the prediction scheme. This scheme may also easily be extended by applying control theory concepts.

Allocation Based Adaptive Margin Block Size

In some examples, one drawback of examples of adaptive margin techniques described herein may be that the number of frames it takes to reach the block size N_TBLOCK depends on the size of the allocation. For example, an allocation spanning one sub-band may be 64 times slower in adjusting the margin compared to an allocation spanning 64 sub-bands due to the number of TB per frame dependency on allocation size. While various adaptive block size schemes are possible, once simple scheme of low implementation complexity is to simply compute a per-frame block size as:

$$\text{N\_TBLOCK}(n) = \text{N\_TBLOCK\_FULL}\frac{N_{sb}}{N_{sbMax}} \qquad \text{Equation (6)}$$

where N_TBLOCK_FULL denotes the full block size that is used for a full allocation of all sub-bands $N_{sbMax}$. For smaller allocations, the block size is scaled based on the number of allocated sub-bands as shown in equation (6). In order to maintain the same overall error rate the increase and decrease thresholds also needs to be modified as:

$$\text{N\_ERR\_INC}(n) = \text{round}\left[\text{N\_ERR\_INC\_FULL}\frac{N_{sb}}{N_{sbMax}}\right] \qquad \text{Equation (7)}$$

$$\text{N\_ERR\_DEC}(n) = \text{ceil}\left[\text{N\_ERR\_DEC\_FULL}\frac{N_{sb}}{N_{sbMax}}\right]$$

Using the block size in Equation (6) and thresholds in Equation (7), the adaptation speed or convergence rate may be significantly less dependent on the allocation size. In some examples, this scheme may also be combined with the adaptive block size based on number of down adjustments described herein. It should be appreciated that additional and/or alternative implementation options may be devised that achieve the same or similar behavior. Another example is to define a few allocation size levels such as 8, 16, 32, 64 sub-bands and corresponding block size and then characterize each allocation to the closest allocation size level. For allocations that are dynamic in time, the above equations may be adjusted to use a time averaged number of allocated sub-bands instead.

Margin Adjustment Based on Granularity

In some examples, manually offsetting the margin until performance is optimized where the margin for each sub-band is selected as MAR(SB)=MAR_AVG +MAR_SB_ADJ(N_GSB) where MAR_AVG denotes the average margin across all sub-band grouping options and MAR_SB_ADJ is a look-up table (e.g., LUT 130 of FIGS. 1A and 1B) with the adjustment as a function of the number of grouped sub-bands. The different adaptive margin methods described herein may then be applied to the average margin MAR_AVG. In some examples, ACM circuitry, such as ACM circuitry 126 of FIGS. 1A and 1B and/or ACM circuitry 202 of FIG. 2 may perform the offsetting and/or other margin adjustment described herein. As should be appreciated, in some examples, additional and/or alternative components of system 100 may also perform such offsetting and/or other margin adjustment.

In some examples, another option is to separate the TBEs per-sub-band per-spatial-stream into groups based on the sub-band grouping for each sub-band. Then the adaptive margin can be computed independently for each grouping number. A drawback of this scheme in some examples may be a higher computation and slower convergence due to fewer TBs in each group.

In some examples, a separate margin for each group size can be obtained by still separating the TBEs into groups based on the number of grouped sub-bands. However, instead of computing a separate adaptive margin, a common adaptive margin is computed and then offset by a vector with a zero mean adjustments for each of the groups. For example systems described herein, the possible groupings are 1, 2, 4, or 8 so the length of the vector is four. Each time the adaptive margin is adjusted as described by Algorithm (2), the TBEs and TBs may be sorted into groups based on the sub-band grouping. In some examples, compute the TBER for each group and find the grouping ii with the highest TBER. Then define an adjustment update vector MAR_SB_ADJ_DELTA as having elements—D except for element ii that has the value 3D resulting in a zero mean adjustment update vector MAR_SB_ADJ_DELTA. The adjustment vector based on grouping is then computed as MAR_SB_ADJ=MAR_SB_ADJ+MAR_SB_ADJ_DELTA. The final margin may then be calculated MAR (SB)= MAR_AVG+MAR_SB_ADJ (N_GSB). For example, assume that the margin is starting out at 3.00 for all sub-groups. At the first update, the grouping of a single sub-band has the highest TBER so the adjustment update vector MAR_SB_ADJ_DELTA=[0.03,−0.01,−0.01,−0.01] for D=0.01. Hence, the adjustment vector becomes MAR_S-B_ADJ=[0.03,−0.01,−0.01,−0.01] since no previous adjustment was available. At the next update, grouping of two sub-bands has the highest TBER so the MAR_SB_ADJ_DELTA=[−0.01, 0.03,−0.01,−0.011] and MAR_SB_ADJ=[0.02, 0.02,−0.02,−0.02]. To avoid dynamic interaction with the overall margin, D should be selected small so the per sub-group size adjustment is very slowly varying. Enhancements such as maximum adjustment and weighting based on allocated sub-bands may further improve performance.

Error Burst Mode

In some examples, ACM algorithm(s) described herein primarily react to observed metrics, such as SINR and TBEs. In many cases, there can be intermittent interference that goes on and off and each time the SNR may drop and the MCS is lowered. Unfortunately, due to the latency in the SINR feedback, errors accumulate during this time that cause a lower throughput. If the type of error source is not reflected in the SINR, errors may accumulate until the adaptive margin reacts. Although the two sources are different, in both cases it results in errors during each error cycle or burst.

In some examples, one way to avoid or reduce the effects of an error burst may be to monitor the current and past behavior and change the state of the link to an error burst mode where the margin is increased pre-emptively to avoid frequent error cycles. In some examples, one drawback of this approach may be that the eliminated or lower error rate comes at the cost of a lower MCS until the link is declared to be out of the error burst mode. While various different implementations are possible, one is to monitor TBEs bursts and SINR drops and set the link in the error burst mode for a time and then evaluate if it can return to normal mode. Different levels of margin increase can be applied within this mode. For example, if the error burst mode is active but errors still accumulate, the margin may be further increased. An error burst mode may be efficient when there are strong interference sources or highly dynamic channel conditions that come and go relatively frequently but slower than the standard adaptive margin decay times. Another benefit of an error burst mode in some examples is that it can be implemented with a much finer granularity than an adaptive margin.

In some examples, error burst ACM handling is applicable in both UL and DL link directions. To reduce the latency and the impact on the general ACM algorithm, the local node (e.g., remote node, base node, residential node, etc.) can pre-emptively reduce the reported SINR. By having the local node reduce the SINR, no extra feedback may be required. The RN may also have access to more channel condition parameters that can be used to make the local decision of activating the error burst mode rather than feeding burst metrics back to the BN.

In some examples, another option of implementing an error burst mode is to use a memory of the lowest SINR across a window of time that is used for the effective SINR instead of the current SINR. If the number of TBE over the current memory length is higher than a threshold, then increase the window size over which the minimum SINR is calculated. Conversely, in some examples, if the transport block error is below the threshold, then decrease the window size.

An example of possible window lengths are 0, 2, 4, 8, 16, 32, and 64 frames. If the bursts are very infrequent, retransmissions are effective so there is no need for very long memory lengths. A short memory should not change the SINR much while the window size is going back to zero. The response time to go from no memory to full memory in the example is only sum (2, 4, 8, 16, 32, 64)=126 frames. Conversely, it is only 126 frames to go back to no memory.

No Data MCS Indicator

In some examples, one limitation of the ACM schemes discussed herein may be that if a sub-band or group of sub-bands are exposed to an error source such as external interference, even the lowest MCS (or SNR) could generate errors. Consider an allocation that spans many sub-bands of which one is exposed to very strong interference and even the lowest MCS cannot be received correctly. If that sub-band consistently is in error, larger packets that require many transport blocks would consistently be in error, triggering ARQ re-transmissions that would also consistently be in error. Furthermore, the errors would accumulate resulting in a larger margin for the whole allocation and a dramatically lower throughput on the "good" sub-bands.

To avoid this scenario, the ACM scheme may report the MCS back to the scheduler (e.g., scheduler 204, and as indicated in FIG. 2) which may enable the scheduler (e.g., scheduler 204) to remove the allocation at the error prone sub-band. A problem with this approach in some examples may be that the scheduler is not aware the difference between the lowest MCS with no errors or the lowest MCS with many errors. One way of avoiding this scenario is to change the PHY to not send any of the information bits on this sub-band since that would avoid a repeated retransmissions. Hence, there is a desire to have a special MCS that indicates no data transmission is possible. Defining a no data MCS would signal to the scheduler that this sub-band is not capable of sustaining any payload data and need to be removed. Similarly, a no data MCS used inside the PHY to not map any information bits onto sub-bands avoid packets consistently being in errors and repeated retransmissions. This would also avoid running up the adaptive margin due to the errors on the sub-bands not capable of supporting the lowest MCS.

Simulations and tests show large gains with this approach for the case of one or a group of poor sub-bands which can often be a common case in practical broadband wireless access system operating in un-licensed bands.

MCS Selection Incorporating Allocation Granularity and Packet Size

Broadband wireless access systems are capable of transmitting at very high data rates such as Gbits/s but some applications such as voice-over-internet-protocol (VOIP) have their data rate requirements measured in kbits/s. In many systems, the minimum allocation size can exceed the typical VOIP packet leading to possible inefficient allocations. Another aspect is that there are latency requirements making re-transmissions are undesirable. Other types of applications that have a large portion of small packets with latency constraints is online gaming applications. A unique aspect of TDD RDB systems is that the UL and DL are matched to enable channel reciprocity. However, the UL and DL traffic requirements can be quite different. For instance, a large packet with an updated graphical picture of the game situation is sent in the DL while a very short packet such as walk forward is sent in the UL. Since the allocations span the same number of sub-bands, only a portion of the UL capacity may be required.

In the example system, an allocation where the encoded information bits does not fill up the allocation, additional bits are added or padded to fill out the allocation. This may be in-efficient but sometimes advantageous as described above. To avoid costly re-transmissions of possibly latency sensitive small packets, a lower MCS can be used to better protect the information bits without losing any throughput. In this manner, the padded bits may be reduced, which are not used anyways, and replaced with additional bits created by choosing a lower MCS. This can make a large difference both for the UL/DL example as well as the small packet example where the allocation granularity is larger than the packet size.

MCS based padding minimization may be implemented in many different ways. One PHY oriented technique is to monitor the padding per group of sub-bands and lower the MCS until the padding is minimized. A MAC centric approach is to monitor the queue and match the MCS with the allocation granularity. This works well for single small packets but less well for gaps in allocation granularity. Another technique is to monitor the traffic and separate it into different queues where a lower MCS is used for queues designated as small packet queues. Possible discrepancies between UL and DL may be monitored well by just looking at the overall queue depth without monitoring padding of individual sub-bands and queues.

Dynamic TBER Target Based on the Selected MCS and Packet Distribution

The adaptive margin described herein is based at least in part on counting TBEs and achieving a specific TBER which is one of several PHY parameters. However, the TBER is only partly related to the user experience, which is more directly impacted by throughput and packet errors of different traffic protocol. A different adaptive margin approach is to target the packet error (PER) instead of the TBER. A challenge with this approach is that the PER is not directly a PHY parameter. It can be observed by measuring the packet performance at the switch or higher layers. However, with padding and UL and DL traffic imbalances there might be cases where transport blocks are sent without any corresponding traffic leaving no relevant PER to base the margin on.

Another challenge is that the adaptive margin controls the TBER that then maps into a PER. That mapping depends on the size of packets as well as the MCS level. For example, assuming uncorrelated errors may be expressed as:

$$PER = 1-(1-TBER)^{N_{tb}} \quad \text{Equation (8)}$$

where $N_{tb}$ denotes the number of transport blocks that are required to transmit one packet. Using the binomial approximation, the PER can be expressed as:

$$PER \approx N_{tb} TBER \quad \text{Equation (9)}$$

Note that in practice, errors may be correlated which changes the TBER PER relationship significantly and that HARQ or ARQ will lower the final error rate at the cost of increased latency. It is clear that the mapping depends strongly on $N_{tb}$. A typical large Ethernet packet is 1500 bytes while a small packet may be just 64 bytes. Further assuming a minimum TB size of 48 bytes and a maximum TB size of 354 bytes, it is clear that the range of $N_{tb}$ in this example would be $N_{tb} \in [1, 32]$. For example, selecting an operating point of TBER=0.001 could yield PER=0.001 all the way up to PER=3.2% depending on MCS and packet size before retransmissions. Most traffic control protocols work best at a PER below a certain level such as 0.001% or 1e-5. Selecting a TBER target of 0.001 but sending a 1500 byte packet using the lowest MCS would result in a 3.2% PER before retransmissions which may be too large for most traffic control protocols. Retransmissions will reduce the PER but add latency that interact with most traffic control protocols in negative way due the extra latency (particularly for TDD).

Based on the above observations, better performance can be obtained by having a dynamic TBER target based on the MCS and packet distribution with the goal of achieving a target PER. For example, in the above example where one packet spanned 32 transport blocks, a TBER target of 3e-5 would approximate a PER of 0.001. Fortunately, for most codecs, the TBER versus SNR is relatively steep so the SINR increase is not as significant as the difference in operating point may suggest.

There are many different techniques that can be designed to calculate the TBER target in order to achieve a target PER. In some examples, a low complexity technique would be to assume large 1500 byte packets, compute the predicted average MCS based on a pathloss which is fairly static, compute $N_{tb}$, and then use Equation (9) to compute the TBER target. In some examples, a slightly more involved technique is to compute a time averaged MCS level and use that to compute Nib, and then use Equation (9) to compute the TBER target. This would be more accurate but would still not reflect the distribution of packets. In some examples, the previous technique can be extended to compute both average MCS and average packet sizes by monitoring the queues and switch metrics. In some examples, an even better performing technique is to separate traffic into different queues based on packet size and use that to select a separate TBER target per queue type using a separate adaptive margin per queue. For example, the large packet queue would use a lower TBER target than the small packet queue. Yet, in some examples, another possible implementation is to use a margin that depends on the SINR such that a larger margin is used for lower SNRs where a lower MCS would lead to a larger $N_{tb}$.

Static and Dynamic Packet Fragmentation

Examples described herein have included a description of the relationship between TBER and PER and that the application performance is closely related to the PER but the ACM module is more closely related to the TBER. Several techniques to dynamically select the TBER target based on the PER and packet size are described herein. A different approach to the same issue may be to modify the modem packet size to make the TBER closer to the PER by using fewer transport blocks to send a modem packet. Modem packet size is defined here as the packet size that the transmit and receive modems uses which is different from the input packet size. One approach is to split a large input packet into several smaller modem packets, e.g. fragment the input packet. These smaller modem packets may exhibit a PER that is closer to the TBER than the original input packet and may result in better performance. The packet fragmentation can be static or dynamic. For example, all packets larger than 128 bytes may be split into smaller packets of maximum size of 128 bytes. It can also be dynamic where links with poor SINR and correspondingly low MCS requires many transport blocks per packet, the input packet may be split into smaller packets than a high MCS link. The static or dynamic packet fragmentation sizes may be based on operator input and/or link parameters such as SINR, pathloss, geographical location, etc. The packet fragmentation may be implemented either in software or hardware or a combination thereof.

ACM Integrated with Adaptive Transmit Power Control

There are many examples where there is a benefit of integrating ACM with adaptive transmit power control (ATPC). For example, the DL may have four allocated users and one user is closer to the next higher MCS level while the others are not. In this scenario, ACM can inform ATPC that a small power increase to that user at the expense of slightly lower power for the other users would enable that user to select the next higher MCS with higher system throughput as a result. Variations of this scheme is power sharing between different spatial dimensions used by a single user often referred to as water-filling. Yet another example is that close users with a high SNR can share some of their power with cell-edge users with a low SINR and thus low MCS.

Adaptive Margin with Sector Edge Input

A common problem is that users located on the edge between different cell sectors suffer from interference from neighboring sectors. Although a RDB system is uniquely equipped to handle this interference by spatial beamforming, it still has the potential to impact the SINR. For example, if a neighboring sector of the same cell schedules a new allocation on a sub-band that already has a user with similar spatial structure in a neighboring sector, both will experience a lower SINR than expected. With a fine-grained MCS selection, only the sub-bands affected will suffer from a lower MCS but the initial MCS before feedback is received might be too high and generate errors. One way of avoiding this scenario is to designate some RNs as sector edge RNs based on their estimated SINR of the broadcast channel of neighboring sectors. For RNs designated as sector edge users, the initial MCS is selected with an additional offset. Of course, more advanced solutions that avoids poor allocations is to avoid scheduling sector edge users from different sectors on the same sub-band. For example, sector edge users may only be allocated to a portion of the band that is different for each sector. This increases the scheduler complexity but may improve the MCS and the resulting throughput.

Adaptive Margin Based on Capacity Utilization

Deployed broadband wireless access systems described herein often operate at only a fraction of the total capacity. In such cases, the network interference level can be reduced by only allocating the sub-bands needed to support the requested traffic. Alternatively, an algorithm monitoring the capacity utilization may be employed that increases the margin when the capacity utilization is low. This may reduce the errors and improves the user experience considerably assuming that the network level interference is effectively managed. One method of managing the interference is to only employ the extra margin for non-sector-edge users. The classification of sector-edge users is also described herein.

As should be appreciated, and as described herein, ACM circuitry 202 may be implemented in hardware, software, firmware, or combinations thereof. ACM circuitry 202 may, for example, including one or more processors, controllers, and/or circuitry. ACM circuitry 202 may include one or more computer readable media encoded with instructions (e.g., code) which, when executed, cause ACM circuitry 202 to perform operations described herein.

Figure 4:
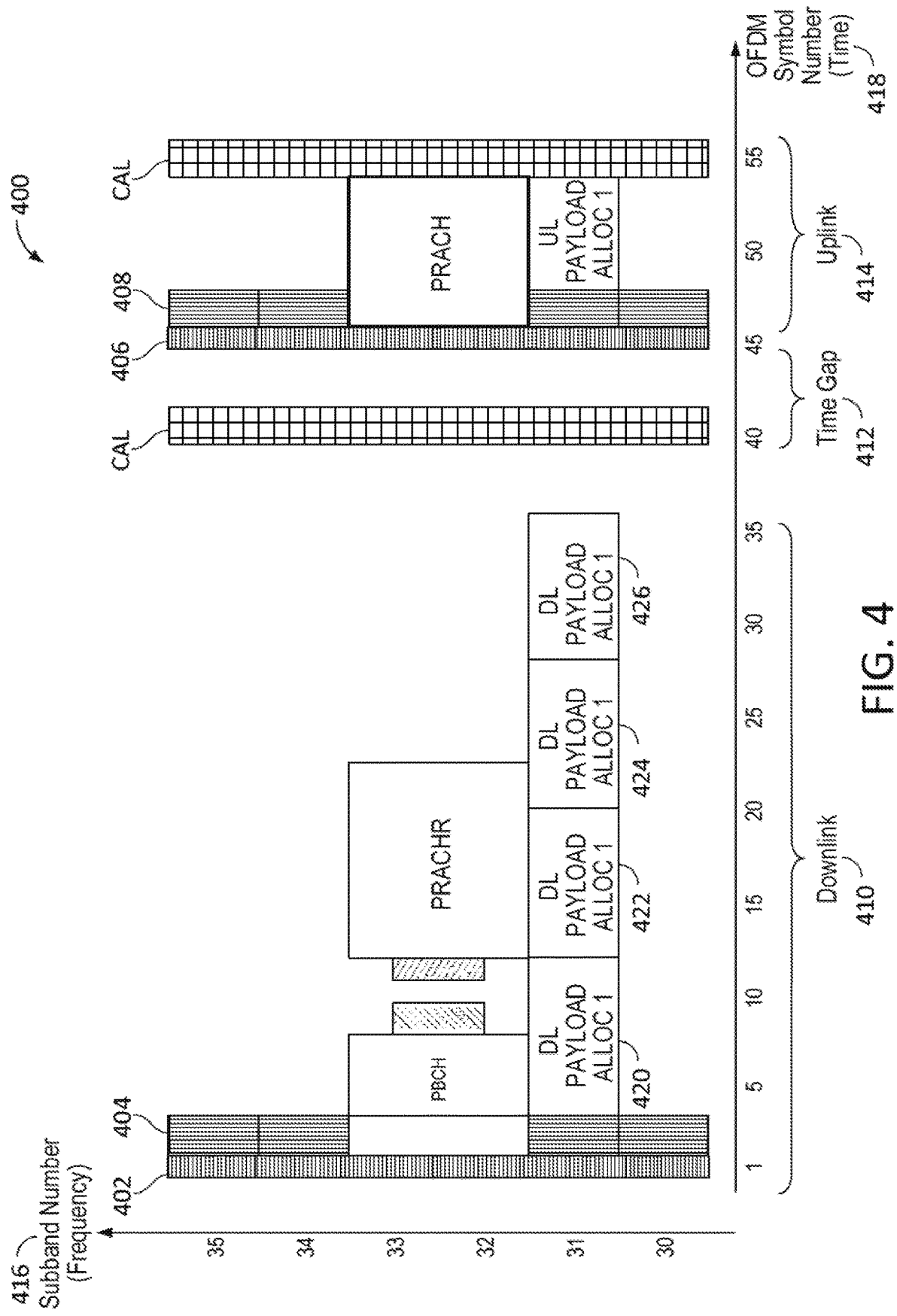
FIG. 4 is a schematic illustration of an example time-division-duplex orthogonal frequency-division multiple access (OFDMA) radio frame-structure, in accordance with examples described herein.

Now turning to FIG. 4, FIG. 4 is a schematic illustration of a radio frame structure, in accordance with examples described herein. Although examples described herein are generally applicable to TDD retro-directive beamforming (RDB) systems with dynamic allocations in time, frequency, and/or spatial multiplexing of multiple users in general, an example implementation depicted in FIG. 4 is used to facilitate understanding. Examples described herein may generally focus on the physical (PHY) layer but some aspects from the medium-access (MAC) layer are described as well.

Many modern wireless communications systems (e.g., LTE, WiMax, etc.) have adopted OFDM and/or OFDM multiple-access (OFDMA) as a communication standard, as described herein. Under OFDM the frequency domain is divided into a set of equally spaced subcarriers, and the time domain is divided into equally spaced symbols as shown in FIG. 4.

FIG. 4 illustrates subcarriers and symbols in accordance with examples described herein. The vertical-axis 416 represents frequency, while the horizontal-axis 418 represents time. The frequency domain (e.g., vertical-axis) is divided into a number of sub-bands, with sub-bands 30-35 being shown in FIG. 4. Any number of sub-bands may be used where each sub-band contains a specified number of subcarriers, not shown, corresponding to the bins of an OFDM Fast Fourier Transform (FFT) residing within that sub-band. The time domain (e.g., horizontal-axis) is divided into FFT blocks, referred to herein as OFDM symbols. 55 OFDM symbols are shown in FIG. 4, although any number may be used within the same or a different amount of time by resizing the FFT as needed.

An example of a TDD orthogonal frequency-division multiple access (OFDMA) frame-structure in FIG. 4, where a base station (BS) or base node (BN) is transmitting to a user equipment (UE) or residential node (RN) during the first part of the frame (symbols 0-40). This part is often called the down-link (DL) part of the frame, e.g., downlink 410. After a time gap, e.g., time gap 412, the RN may transmit to the BS or BN for the remainder of the frame. That part is often called the up-link (UL) portion of the frame, e.g., uplink 414, and in this example covers symbols 44-55 in FIG. 4.

In some examples, user allocations are scheduled in units of a sub-band that spans a number of OFDM subcarriers. In the example implementation depicted in FIG. 4, an OFDM FFT size of 4096 subcarriers over a 40 MHz carrier covers 66 sub-bands with 52 subcarriers in each sub-band. For other bandwidths, the number of sub-bands may be different. For TDD RDB systems, UL and DL allocations may span the same sub-bands to exploit channel reciprocity. In the example show in FIG. 4, a user is allocated sub-band 31 resulting in 32 data OFDM symbols over 52 subcarriers in the DL and 8 data symbols over the same subcarriers in the UL. The remaining symbols are used for control channels, beamformer training, and channel sounding.

In some examples, and similarly described in FIG. 3, various packets such as input packets may be converted into modem packets (e.g., by packet processor 118 of FIGS. 1A and 1B) that in turn are sent over the link in one or many transport blocks (TB) (e.g., payload 420, 422, 424, and 426) depending on packet size and TB MCS across the allocated sub-bands and symbols. The mapping of modem packets into transport blocks can be done in many ways. A simple mapping is the natural order while more complicated mappings such as various forms of pseudo-random mappings that spreads a modem packet across the transport blocks are possible. Furthermore, the transport blocks can be mapped or striped into sub-bands in many different ways as well.

In some examples, uplink allocation information 406 and per-sub-band MCS information 408 may be sent back to the BS or the BN, by the RN. In some examples, uplink allocation information 406 and per-sub-band MCS information 408 sent back by the RN may be used by, for example, scheduler 116 or switch 120, or packet processor 118 of FIGS. 1A and 1B for subsequent allocation of sub-bands and subsequent transmission of packets over links of various wireless communications (e.g., access) systems described herein. In some examples, a base node may determine a UL and/ or a DL allocation (they are matched for RDB) so an RN does not send information about which sub-bands/ streams are allocated, but does send information, e.g., channel quality information for the allocated sub-bands.

In some examples, the information and/or content of a CCE and FCCH channel may be different in the UL and DL.

For example, the DL FCCH may in some examples contain the MCS and power control information, and the UL FCCH may contain the SINR and error information per sub-band. Similarly, in some examples, the DL CCE may contain allocation information while the UL CCE may contain channel information from a node (e.g., a remote node), such as for example, overall errors, power control information, and/or many other metrics.

Now turning to FIG. 5, FIG. 5 illustrates transport block mapping sub-bands and reference symbols, in accordance with examples described herein. As depicted herein, FIG. 5 is one example for a frame structure 500 (e.g., frame 500). Frame structure 500 includes 18 data symbols (shown on x-axis 502) with an allocation spanning sub-bands 1-6 and 8-16 (skipping sub-band 7) (shown on y-axis 504). In some examples, a TB (e.g., TB 506 and/or TB 508) needs to span eight resource elements where a resource element is one sub-band and symbol. The first transport block (TB) in frame 500 (e.g., TB 506) is striped across sub-bands 1-4 and symbols one and two. Alternatively, this can be viewed as grouping sub-bands 1-4 together in terms of MCS since each TB has a single MCS. In some examples, grouping sub-bands together impacts not only the payload data performance but also the MCS signaling and feedback. As depicted herein, various TB blocks are labeled as TB1 through TB33.

As depicted, the next three TBs are sent over the next six symbols while the fifth TB is sent over sub-bands 5-6 over symbols one through four. Transport block striping may be optimized for performance both in terms of payload performance and feedback channel performance. In many examples, the receiver needs to be aware how the transmitter striped the TBs either through dedicated signaling or through rules known by both transmitter and receiver. Further enhancements are possible, where certain packets are prioritized to be sent on sub-bands with better performance in terms of performance metrics such as SINR and/or TBER.

Each link's allocation and MCS selection operations are managed over a combination of two bidirectional (UL and DL) control channel types, one type termed the link control channel element (CCE), of which there is one per link, and the other type termed the fast control channel (FCCH), of which there is one per-sub-band per-spatial stream allocated to that link. The allocation information, such as which sub-bands and spatial dimension a user is allocated to, is conveyed in the first symbol in the CCE. Each user has a dedicated beamformed CCE channel spanning a small number of sub-bands. Hence, the CCE channel is not a broadcast channel since that would limit the possibilities of beamforming that enables high throughput and robust interference performance.

A difference from LTE and WiMAX is that the control channel (CCE) does not contain the MCS selection, which is instead contained in a separate channel labeled DL FCCH, which is integrated into the reference symbols (RS). For high performance, the beamformer may be trained independently on each sub-band and each frame using the RS. In addition, a separate DL FCCH channel is maintained per-sub-band per spatial stream which enables a distinct MCS per-sub-band per spatial stream. Hence, the MCS information is separate from the allocation information that is sent on the CCE in a sub-band or sub-bands unrelated to the allocation. Furthermore, the matching UL allocations provide a fine-grained feedback channel from the RN to the BN of channel condition metrics within the UL FCCH. Examples of metrics include, but are not limited to, signal-to-interference-and-noise-ratio (SINR) and different types of codec conditions (errors, decoder iterations, etc.). Furthermore, if sub-bands are grouped together, for example as shown here in FIG. 5, various forms of coding of the feedback may be used to improve the reliability of decoding the FCCH channel. A simple example of coding that improves the reliability is to repeat the same information in the FCCH channel across the grouped sub-bands.

Figure 6:
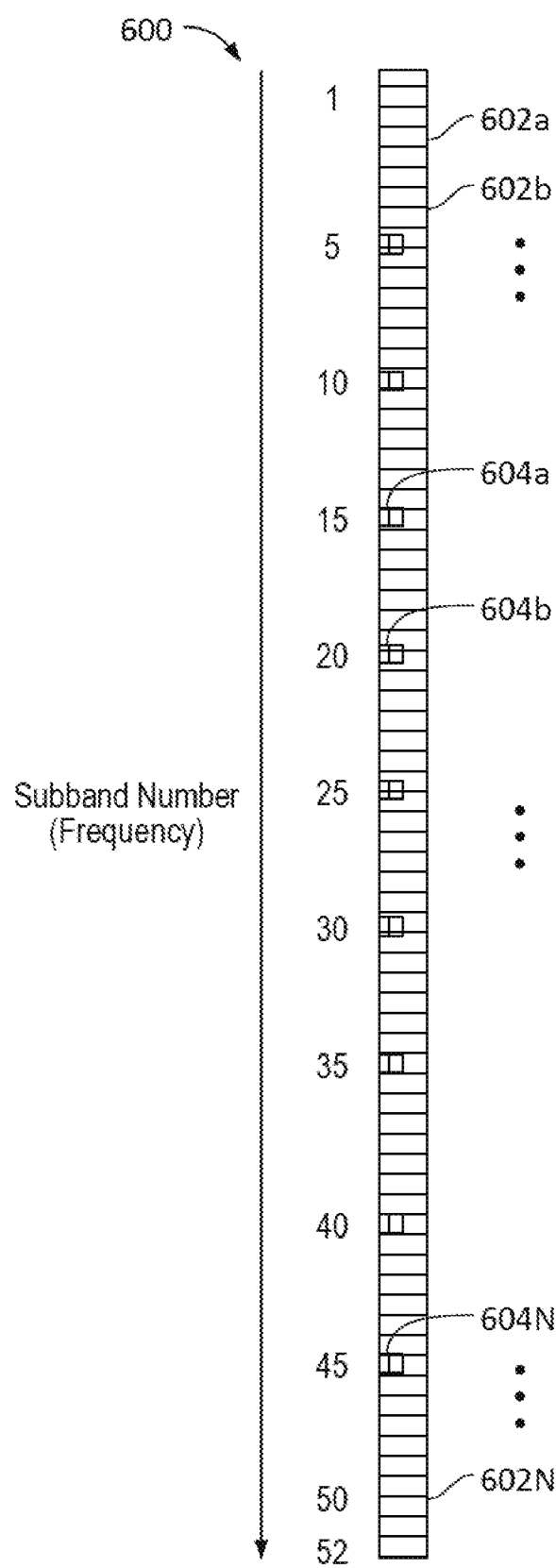
FIG. 6 illustrates a reference symbol punctuated with fast control channel for one sub channel, in accordance with examples described herein.

Now turning to FIG. 6, FIG. 6 illustrates a reference symbol (RS) punctuated with fast control channel (FCCH) for one sub channel, in accordance with examples described herein.

Recall that, in examples described herein, a control channel (CCE) may not contain an MCS selection. In some examples, instead, an MCS selection may be contained in a separate channel, such as a DL FCCH. As depicted in FIG. 6, FCCHs, such as FCCH 604a-604n may be integrated into the reference symbols (RS), such as reference symbols 602a-602n. In some examples, for high performance, the beamformer is trained independently on each sub-band and each frame using the RS. In addition, a separate DL FCCH channel is maintained per-sub-band per spatial stream, which in some examples enables a distinct MCS per-sub-band per spatial stream. Hence, the MCS information may be separate from the allocation information that is sent on the CCE in a sub-band or sub-bands unrelated to the allocation.

Recall that the feedback of channel conditions (e.g., per-sub-band per-spatial-stream) from a remote node (e.g., residential node, remote node 208 of FIG. 2, etc.) to a base node (e.g., base node 206 of FIG. 2) may, in some examples, enable ACM circuitry (e.g., ACM circuitry 202 of FIG. 2) coupled to the base node to select UL MCS and/or DL MCS. In some examples, selecting both UL and DL MCS at the base node (e.g., base node 206 of FIG. 2) may make it possible to include knowledge of the presence of other users (e.g., other remote nodes of wireless communications systems described herein) that may share the same sub-band and their spatial compatibility. In some examples, it may also enable the incorporation of dynamic beamforming effects of new users (e.g., new remote nodes) entering or users leaving the sub-band into the MCS selection. In some examples, if the RN (e.g., remote node 208 of FIG. 2) selects the UL MCS, that type of information would not be available since, in some examples, only the BN (e.g., base node 206 of FIG. 2) has access to the allocation of other users (via a scheduler and/or a spatial database, such as scheduler 116 and/or spatial database 124 of FIGS. 1A and 1B). In some examples, it may also enable a BN (such as base node 206 of FIGS. 1A and 1B) to share scheduling information between itself and nearby BNs to further improve performance by coordinating the per-sub-band per-spatial-stream user scheduling and MCS selection across sectors. In some examples, that information may contain metrics such as distance to BN but also spatial information and compatibility with other users.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Examples described herein may refer to various components as "coupled" or signals as being "provided to" or "received from" certain components. It is to be understood that in some examples, the components are directly to one another, while in other examples, the components are coupled with intervening components disposed between them. Similarly, a signal(s) may be provided directly to and/or received directly from the recited components without intervening components, but also may be provided to and/or received from the certain components through intervening components.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method comprising:
   receiving channel condition metrics regarding wireless communication conditions from a communication node of a wireless access system having a plurality of communication nodes;
   selecting a selected modulation and coding scheme for a sub-band of a communication stream, wherein the selected modulation and coding scheme for the sub-band is different than another modulation and coding scheme selected for another sub-band of the communication stream or another communication stream; and
   transmitting the selected modulation and coding scheme to the communication node using a fast control channel (FCCH), wherein the FCCH is integrated into reference symbols configured to train beamformers to communicate the selected modulation and coding scheme and perform interference cancellation using multiple antennas.

2. The method of claim 1, wherein the sub-band comprises multiple sub-carriers.

3. The method of claim 1, wherein the sub-band comprises a frequency band.

4. The method of claim 1, further comprising:
   transmitting allocation information over a first channel type and the selected modulation and coding scheme over a second channel type, wherein the first channel type is different from the second channel type.

5. The method of claim 4, wherein the first channel type is a control channel element (CCE).

6. The method of claim 4, wherein the second channel type is the fast control channel (FCCH), and the selected modulation and coding scheme is transmitted per sub-band and per-stream in the FCCH.

7. The method of claim 4, wherein the first channel type, the second channel type, or combinations thereof, are bidirectional channels.

8. The method of claim 4, wherein a separate modulation and coding scheme for the sub-band of the communication stream is selected for each communication direction.

9. The method of claim 4, wherein the allocation information is dynamic in time, frequency, space, or combinations thereof.

10. The method of claim 5, wherein the CCE is configured to beamform the allocation information using the multiple antennas for high performance and robust interference cancellation.

11. The method of claim 5, wherein the CCE is configured to send compressed information about an error rate.

12. The method of claim 6, wherein the FCCH is integrated into the reference symbols configured to train the beamformers to beamform the modulation and coding scheme using the multiple antennas for high performance and robust interference cancellation.

13. The method of claim 1, further comprising:
   encoding and transmitting a transport block in accordance with the selected modulation and coding scheme, wherein the transport block is transmitted in one or more of a plurality of radio frames, the transport block derived from a packet, the packet comprising an Ethernet packet, an input packet, a modem packet, or combinations thereof.

14. The method of claim 13, wherein encoding and transmitting the transport block includes selecting a target transport block error rate based at least on the selected modulation and coding scheme and an input packet size.

15. The method of claim 13, wherein the input packet, the Ethernet packet, or combinations thereof, is configured to fragment into the modem packet, wherein a size of the modem packet is determined statically, dynamically, or combinations thereof.

16. The method of claim 1, wherein the channel condition metrics include a signal-to-interference-and-noise-ratio (SINR), codec conditions, or combinations thereof.

17. The method of claim 16, wherein the codec conditions include error counts, transport block error rates, decoder iterations, or combinations thereof.

18. The method of claim 1, wherein the plurality of communication nodes include a base node, a remote node, or combinations thereof.

19. The method of claim 18, wherein transmitting communications between the plurality of communication nodes, including the base node, the remote node, or combinations thereof, is based on the multiple antennas using retro-directive beamforming.

20. The method of claim 1, wherein selecting the selected modulation and coding scheme is further based at least on a capacity utilization of the wireless access system.

21. The method of claim 1, wherein selecting the selected modulation and coding scheme is further based at least on a look up table.

22. The method of claim 1, wherein selecting the selected modulation and coding scheme is further based at least on selection parameters.

23. The method of claim 22, wherein the selection parameters include at least a margin, a hysteresis, or combinations thereof.

24. The method of claim 23, wherein selecting the margin, the hysteresis, or combinations thereof, is based at least on a preferred modulation and coding scheme switching rate.

25. The method of claim 23, wherein the margin is configured to adapt to achieve a performance criterion, the performance criterion including at least one of a specific error rate, a re-transmission rate, a decoder quality performance metric, or combinations thereof.

26. The method of claim 23, wherein the margin is configured to adapt to achieve a specific error rate based on a number of errors over a number of transport blocks.

27. The method of claim 26, wherein the number of transport blocks are dynamically adapted in order to improve adaptation speed.

28. The method of claim 27, wherein the number of transport blocks are dynamically adapted based at least on previous margin adjustments in order to improve the adaptation speed.

29. The method of claim 27, wherein the number of transport blocks are dynamically adapted based on a number of allocated sub-bands in order to improve the adaptation speed.

30. The method of claim 23, wherein the margin is configured to adapt based on a granularity of the sub-band, a plurality of sub-bands, or combinations thereof, spanned by the selected modulation and coding scheme.

31. The method of claim 1, wherein selecting the selected modulation and coding scheme is further based at least on scheduling information.

32. The method of claim 1, wherein selecting the modulation and coding scheme before feedback is available is based at least on a location of a node, spatial information, compatibility information, a location within a cell sector, or combinations thereof.

33. The method of claim 32, wherein applying a margin before the feedback is available is based on the location of the node, the spatial information, the compatibility information, the location within the cell sector, or combinations thereof.

34. The method of claim 31, wherein the scheduling information includes at least distance information to a particular communication node, spatial information, compatibility information, or combinations thereof.

35. The method of claim 1, wherein selecting the modulation and coding scheme is further based at least on an adaptive modulation and coding scheme algorithm.

36. The method in claim 1, wherein selecting the modulation and coding scheme based at least on a different step size for a frame when channel quality information becomes available through feedback channels.

37. The method of claim 1, wherein selecting the modulation and coding scheme is further based at least on a padding used to encode blocks to lower error rates, wherein the padding comprises a difference between a capacity and a demand.

38. A method comprising:
receiving channel condition metrics regarding wireless communication conditions from a communication node of a wireless access system having a plurality of communication nodes;
selecting a selected modulation and coding scheme for a sub-band of a communication stream, wherein the selected modulation and coding scheme for the sub-band is different than another modulation and coding scheme selected for another sub-band of the communication stream or another communication stream; and
transmitting the selected modulation and coding scheme to the communication node, wherein a low selected modulation and coding scheme denotes that no payload data or information bits are transmitted to the communication node.

39. A method comprising:
receiving channel condition metrics regarding wireless communication conditions from a communication node of a wireless access system having a plurality of communication nodes;
selecting a selected modulation and coding scheme for a sub-band of a communication stream, wherein the selected modulation and coding scheme for the sub-band is different than another modulation and coding scheme selected for another sub-band of the communication stream or another communication stream;
transmitting the selected modulation and coding scheme to the communication node;
predicting channel condition metrics for even another communications node; and
based on the predicted channel condition metrics, selecting a modulation and coding scheme for the even another communications node.

40. The method of claim 1, further comprising:
based at least on a determination that the received channel condition metrics match a pattern indicative of an error burst, adding an error burst margin to a margin, wherein adding the error burst margin increases the margin to avoid an error cycle.

41. The method of claim 40, wherein the error burst includes an SINR error burst, a decoder error burst, or combinations thereof.

42. The method of claim 1, further comprising:
combining two or more SINR sources to form an effective SINR, wherein SINR sources include reference symbols in a beginning of a frame, pilots transmitted through the frame, or combinations thereof.

43. The method of claim 12, further comprising:
combining, using reciprocal averaging, a SINK channel condition metric from multiple parts of the sub-band.

44. The method of claim 1, further comprising:
adjusting transmit power between users based on a distance to a next MCS level in order to achieve performance metrics comprising per-user throughput and/or total throughput across the users.

45. The method of claim 1, wherein the wireless access system is configured to provide broadband wireless access, including fixed and mobile, high-speed wireless internet access, computer networking access over a wide area at least one or more of a plurality of users, or combinations thereof.

46. The method of claim 1, wherein the wireless access system is a time-division-duplexed retro-directive beamforming wireless access system.

47. A communications node comprising:
a plurality of transceivers, wherein each transceiver of the plurality of transceivers is configured to transmit, receive, or both, RF signals in a frequency band spanning multiple sub-bands of frequencies;
a weight processor coupled to the plurality of transceivers, the weight processor configured to calculate weighted sums of RF signals received at the plurality of transceivers to provide a plurality of streams, or to provide RF signals for transmission by the plurality of transceivers from the plurality of streams in accordance with a set of weights, or both;
adaptive modulation and coding scheme circuitry configured to select a modulation and coding scheme per-sub-band, based on channel condition metrics regarding wireless communication conditions;
a decoder configured to decode each stream of the plurality of streams, or encode the RF signals for transmission, in accordance with the selected modulation and coding scheme, and
the plurality of transceivers, each transceiver further configured to transmit the selected modulation and coding scheme using a fast control channel (FCCH), the FCCH being integrated into reference symbols configured to train beamformers to communicate the selected modulation and coding scheme and perform interference cancellation using multiple antennas.

48. The communications node of claim 47, wherein the channel condition metrics include a signal-to-interference-and-noise-ratio (SINR), codec conditions, or combinations thereof.

49. The communications node of claim 48, wherein the codec conditions include error counts, transport block error rates, decoder iterations, or combinations thereof.

50. The communications node of claim 47, further comprising:
a switch, communicatively coupled to adaptive modulation and coding scheme circuitry, the switch configured to receive, from another communications node of a wireless access communication system, the channel condition metrics regarding the wireless communication conditions, wherein the another communications node is a remote node.

51. The communications node of claim 47, wherein the another communications node is a base node.

52. The communications node of claim 47, wherein the adaptive modulation and coding scheme circuitry is configured to select the modulation and coding scheme per-sub-band, per-stream, based on the channel condition metrics regarding the wireless communication conditions.

53. The communications node of claim 47, wherein the adaptive modulation and coding scheme circuitry is configured to select the modulation and coding scheme based at least on a look up table.

54. The communications node of claim 47, wherein the adaptive modulation and coding scheme circuitry is configured to select the modulation and coding scheme based at least on selection parameters.

55. The communications node of claim 54, wherein the selection parameters include at least a margin, a hysteresis, or combinations thereof.

56. The communications node of claim 47, wherein the adaptive modulation and coding scheme circuitry is further configured to select the modulation and coding scheme based at least on scheduling information, including at least distance information, spatial information, compatibility information, or combinations thereof.

57. The communications node of claim 47, further comprising:
a scheduler configured to provide current allocation information, upcoming allocation information, spatial information, or combinations thereof, to the adaptive modulation and coding scheme circuitry, wherein the adaptive modulation and coding scheme circuitry selects the modulation and coding scheme based at least on the current allocation information, the upcoming allocation information, the spatial information, or combinations thereof, received from the scheduler.

58. The communications node of claim 57, wherein the scheduler is further configured to receive, from the adaptive modulation and coding scheme circuitry, information regarding the selected modulation and coding scheme.

59. The communications node of claim 47, wherein the communications node is a base node.

60. The communications node of claim 47, wherein the communications node is a remote node.

* * * * *